US009904509B1

(12) United States Patent
Raffa et al.

(10) Patent No.: US 9,904,509 B1
(45) Date of Patent: Feb. 27, 2018

(54) METHODS AND APPARATUS TO DETECT THE PERFORMANCE OF AN ACTIVITY BY DETECTING THE PERFORMANCE OF TASKS

(71) Applicant: Intel Corporation, Santa Clara, CA (US)

(72) Inventors: Giuseppe Raffa, Portland, OR (US); Anthony LaMarca, Seattle, WA (US); Jonathan J Huang, Pleasanton, CA (US); Paulo Lopez Meyer, Guadalajara (MX); Hector A Cordourier Maruri, Guadalajara (MX)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/639,876

(22) Filed: Jun. 30, 2017

(51) Int. Cl.
*H04R 29/00* (2006.01)
*G06F 3/16* (2006.01)
*G10L 25/51* (2013.01)

(52) U.S. Cl.
CPC .............. *G06F 3/165* (2013.01); *G10L 25/51* (2013.01); *H04R 29/00* (2013.01)

(58) Field of Classification Search
CPC ...................................................... H04R 29/00
See application file for complete search history.

(56) References Cited

U.S. PATENT DOCUMENTS

| 2017/0124847 | A1* | 5/2017 | Schulz ................. G08B 21/182 |
| 2017/0125034 | A1* | 5/2017 | Kakadiaris ............. G10L 25/51 |

* cited by examiner

*Primary Examiner* — Olisa Anwah
(74) *Attorney, Agent, or Firm* — Hanley, Flight & Zimmerman, LLC

(57) ABSTRACT

Methods, apparatus, systems and articles of manufacture to monitor tasks performed in an environment of interest are disclosed. One such apparatus is a task monitor that includes a signature comparator to compare a first signature to a second signature. The first signature is generated based on first audio collected in an environment of interest and the second signature is generated based on second audio collected during performance of a task in the environment of interest. The task monitor also includes an object identifier to identify an object corresponding to a location determined based on an angle of arrival of the first audio at a sensor. A task identifier is to identify the task as a cause of the first audio when the signature comparator determines the first signature matches the second signature and the object identifier identifies the object as a same object used to perform the task.

25 Claims, 11 Drawing Sheets

METHODS AND APPARATUS TO DETECT THE PERFORMANCE OF AN ACTIVITY BY DETECTING THE PERFORMANCE OF TASKS

FIELD OF THE DISCLOSURE

This disclosure relates generally to monitoring an environment of interest, and, more particularly, to methods, apparatus, and systems to detect the performance of an activity by detecting the performance of tasks.

BACKGROUND

In recent years, there has been increased research into monitoring an environment of interest with the goal of identifying activities being performed in the environment. Some such environments of interest include factory floors, manufacturing facilities, food preparation areas, etc. The activity-related information gained from monitoring such environments can be used to ensure quality control, to promote safety, and to improve processes performed in the monitored environment.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
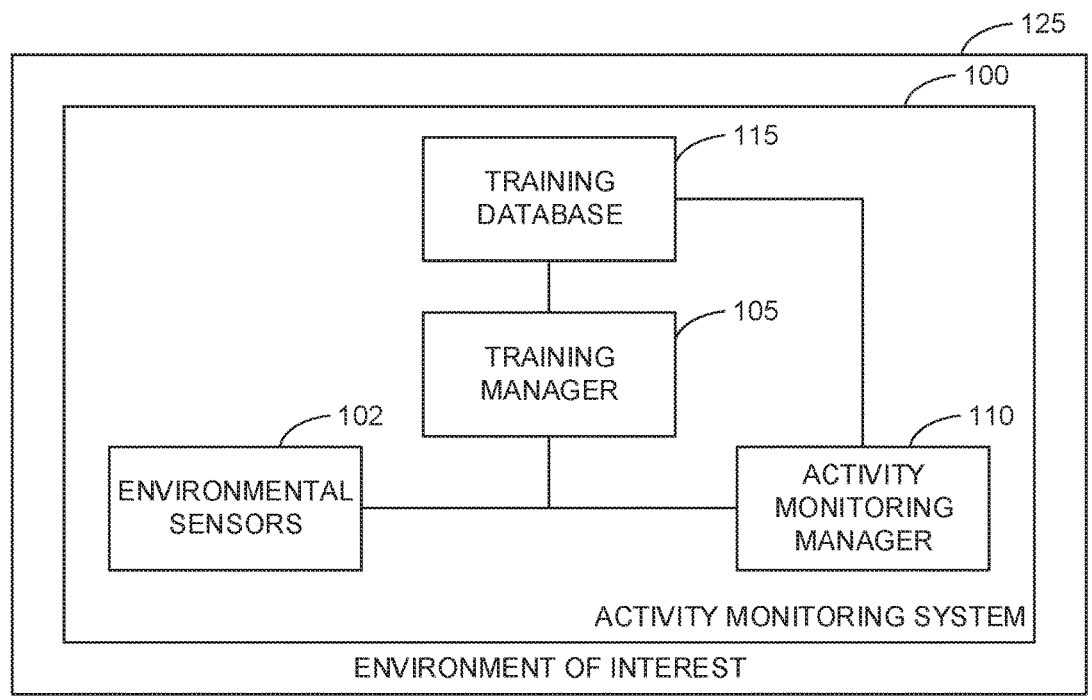
FIG. 1 is a block diagram of an example implementation of an example activity monitoring system having an example training manager and an example activity monitoring manager.

Activity monitoring within an environment of interest can be used to ensure quality control, promote safety, and improve processes performed in the monitored environment. Many activity monitoring systems use video surveillance techniques to create video recordings of the environment. The video recordings are viewed by humans or analyzed using video processing techniques to identify activities performed in the monitored environment. Although effective, such video surveillance techniques are disfavored due to privacy concerns. Additionally, video surveillance techniques can be unreliable when, for example, lighting conditions in the environment of interest are poor and/or a line of sight between the video recording apparatus and an activity becomes obstructed.

Other activity monitoring systems use an Internet of Things (IoT) approach that involves placing sensors on objects located within the environment of interest. The sensors provide information about where the objects are located, whether the objects are moved within the environment of interest, the frequency at which the objects are moved, an order in which multiple objects are moved relative to one another, etc. The information collected by the sensors is used to make inferences about activities performed in the environment. However, the IoT approach can be labor intensive in that the sensors must be attached to the objects in the environment. Further, the IoT approach can be costly in terms of designing the sensors in a form factor suitable for installation on the objects in the environment of interest. Developing and deploying communication functionality by which the sensors can communicate information to a central monitor for analysis further increases the costs of such IoT monitoring systems.

Some activity monitoring systems use audio signatures to identify an activity being performed in an environment of interest (also referred to as one-shot technique). Such systems operate by monitoring the environment of interest and capturing audio generated in the environment. The captured audio information is used to generate a corresponding audio signature which is compared to a set of audio signatures stored in a database. Fingerprint or signature-based monitoring techniques use one or more inherent characteristics of the monitored audio during a monitoring time interval to generate a substantially unique proxy for the collected audio. Such a proxy is referred to a signature or fingerprint, and can take any form (e.g., a series of digital values, a waveform, etc.) representative of any aspects (or aspect) of the audio signals (or signal) being monitored. A signature may be a series of signatures collected in series over a time interval. A good signature is repeatable when processing the same audio, but is unique relative to other (e.g., different) audio. Accordingly, the terms "fingerprint" and 'signature" are used interchangeably herein and are defined herein to mean a proxy of any kind that is generated from one or more inherent characteristics of an audio signal. Signature-based monitoring generally involves determining (e.g., generating an/or collecting) signature(s) representative of an audio signal and comparing the monitored signature(s) to one or more reference signatures corresponding to known (e.g., reference) media sources. Various comparison criteria, such as a cross-correlation value, a Hamming distance, etc., can be evaluated to determine whether a monitored signature matches a particular reference signature.

When a matching signature is found in the database, an activity corresponding to the audio signature stored in the database is identified as having been performed/detected in the environment of interest. However, in such audio-based activity monitoring systems, audio used to develop the signatures for the activities to be monitored stored in the database can only be captured/generated by performing each of the activities from start to finish. Unfortunately, many of the activities to be monitored are lengthy and complex (e.g., requiring multiple steps to complete) such that performing each such activity in a training scenario is time consuming. Further, to generate a robust training database, the activities to be monitored must be performed multiple times to ensure the resulting data (e.g., signatures) is adequately representative of the corresponding activity. In many instances, repetitively executing all possible activities that can be performed in an environment of interest is impractical from a labor and cost perspective. Although obtaining such data using crowd sourcing is a possibility, such an effort is often difficult to coordinate and to control. Further, if any of the steps performed during an activity being monitored in the environment of interest are skipped or performed in a different order than an order used during the training process, a signature generated based on audio captured in the environment of interest during the activity may not match any of the training signatures stored in the training database. In such instances, an activity may not be identifiable or may be misidentified.

Example methods, systems, apparatus and articles of manufacture disclosed herein enable the monitoring of an environment of interest using audio sensing with, or without, the addition of non-audio sensors. Some such example methods capture audio generated in an environment of interest using a microphone array. The microphone array detects the audio and determines an angle of arrival of the audio at the microphone array. "Angle of arrival' as used herein refers to a known technique by which an array of antennas can be used to determine an angle at which a wave (e.g., an audio wave) arrives at the array. Using the angle of arrival and knowledge about where the microphone array is disposed in the environment of interest, a location in the environment from which the captured audio originated (or a direction from which the audio originated) is determined. Using the determined origination location of the audio, an object database is searched to identify an object positioned at the origination location. In such examples, the object and the location of the object serve as clues that are used to identify a task responsible for generating the captured audio.

Some such example methods further include comparing an audio signature generated using the audio captured at the microphone array to a training audio signature. The training audio signature is generated based on audio collected when one or more tasks of an activity were performed in a training mode. When the audio signature generated using the audio captured while monitoring the environment of interest matches one of the training audio signatures, a task associated with the training audio signature is determined to be a "potential cause" of the audio captured while monitoring the environment of interest (also referred to as the "monitored audio").

Some such example methods further include determining whether the object identified based on the location information is associated with the task identified as the "potential cause" of the audio. In some such examples, information identifying the objects that are (or might be used) when performing a task are stored in the training database and/or in an object database and/or a task database. When the object is associated with the task identified as the "potential cause" of the audio, a status of the task is changed from a "potential cause" of the audio to a "determined" cause of the audio.

In some examples, the task identified as the "determined cause" of the monitored audio is added to a list of detected tasks performed within a threshold time of each other. The list of detected tasks can then be compared to sets of activity-related tasks, each of which is known to be associated with an activity. If a threshold number of the detected tasks are included in one of the sets of activity-related tasks, then the corresponding activity is identified as having been performed/detected. In some examples, the order in which the tasks are detected is also used to determine whether the corresponding activity is identified as being performed/detected. In some such examples, the order in which the detected tasks are detected is compared to an order in which the set of activity-related tasks corresponding to the activity in the training database are arranged. If the order/sequence in which the detected tasks are performed matches (or substantially matches) an ordering/sequencing of the tasks included in the set of tasks, then the corresponding activity is identified as having been performed/detected. In some examples, the set of activity-related tasks are associated with several possible sequences in which the activity-related tasks can be performed and still qualify as being associated with an activity. In some such examples, the order/sequence in which the detected tasks were performed is compared to the various possible sequences and, if the sequence of the detected tasks matches one of the various possible sequences of the activity-related tasks, then the activity is determined to have been detected/performed in the environment of interest. In some examples, the duration of time to complete one or more detected tasks can also be used to determine whether an associated activity has been performed in the environment of interest.

Some example methods include accessing a training database containing signatures generated based on training audio collected when corresponding tasks are being performed in a training phase/mode. The training database can contain one or multiple signatures (also called "training signatures") corresponding to audio (also called "training audio") collected during the performance of a task. The training signatures are stored in the signature database with information identifying the corresponding task. When the example activity monitoring system is monitoring the environment of interest in an attempt to identify an activity performed in the environment, audio (also called "monitored audio") is collected by a sensor in the environment of interest. A signature (also called a "monitored signature") is generated based on the monitored audio and compared to the training signatures stored in the training database. When a training signature matching the monitored signature is found, the task corresponding to the training signature is identified as the "potential cause" of the field audio.

Thus, instead of attempting to identify an entire activity using a single audio signature, example methods, apparatus and systems disclosed herein use monitored signatures corresponding to individual tasks performed during the course of an activity. The monitored signatures are used to identify the individual tasks and then compared to sets of activity-related tasks known to be associated with various activities. If the identified individual tasks, or a threshold number thereof, are found in a set of activity-related tasks associated with an activity, the corresponding activity is identified as having been performed/detected in the environment of interest. As used herein, the term "monitored signatures" is used to refer to signatures generated/extracted from audio collected during tasks/activities being monitored, and the terms "training signatures" is used to refer to signatures generated/extracted from audio collected during tasks/activities performed for the purpose of collecting training data.

Example activity monitoring systems disclosed herein can also include a second audio sensor. The second audio sensor can be a microphone array capable of detecting audio and detecting an angle of arrival of the audio. The precise location of an object (or objects) used during the execution of a task can be determined using the monitored audio captured at the first audio sensor and the monitored audio captured at the second audio sensor. In some examples, a location from which captured audio originated is determined by applying a triangulation technique to a first angle of arrival supplied by the first audio sensor and a second angle of arrival supplied by the second audio sensor. The determined location is then compared to the objects stored in the training database to identify an object that resides at the determined location. As described above, the identified object can then be used to conclude that a task identified as a "potential cause" of the audio is instead a "determined cause" of the audio.

In some examples, the activity monitor includes non-audio sensors (e.g., video sensors, cameras, motion sensors, location sensors, etc.). In some such examples, the non-audio sensors can be used to supplement information collected by the audio sensors. In some such examples, the audio sensors are treated as a primary source of information and the non-audio sensors are treated as a secondary source of information. Information supplied by the non-audio sensors can be used when information supplied by the audio sensors is incomplete, damaged, or in some way unusable.

In some examples, the non-audio sensors are a primary source of information and the audio sensors are a secondary source of information. In some such examples, the information captured by the audio sensors is used when information supplied by the non-audio sensors is incomplete, damaged, or in some way unusable (for example, because of too much noise in the environment of interest). In yet further examples, information collected at the audio sensors and the video sensors is jointly used to detect a task within the environment of interest.

Example methods, apparatus, systems and articles of manufacture disclosed herein can be used in any environment of interest to detect the performance of any task(s) and/or activity(ies). One such environment is a kitchen in which food is prepared. In some such environments, the preparation of a particular food item can be an activity and the corresponding task(s) may be any of the action(s) taken to follow a recipe for the food item. In some examples, the food item is scrambled eggs and example tasks can include: 1) opening a cabinet to take out a bowl, 2) opening the same or another cabinet to take out a pan, 3) opening a drawer to take out a whisk, 4) opening the refrigerator and taking eggs out, 5) cracking an egg into a bowl, 6) discarding the egg shell, 7) using the whisk to scramble the egg, 8) spraying a non-stick cooking spray onto the surface of the pan, 9) pouring the scrambled egg into the pan, 10) placing the pan on a stove top, 11) igniting a burner of the stove top, etc. Some of the tasks can be performed out of the specified order (e.g., task 1, 2, 3, and 4 can be performed in any order). Some of the tasks need not be performed (e.g., task 7 need not be performed). The tasks are typically performed using specific objects (e.g., tools) that occupy specific locations or areas in the kitchen. Example methods, apparatus, systems, and articles of manufacture disclosed herein can be configured to monitor the kitchen environment using audio sensors, detect the performance of all or some of the tasks (opening the cabinet, opening the refrigerator, cracking the eggs, etc.) based on audio captured by the audio sensors, and, based on the detected tasks, determine that the activity (e.g., making scrambled eggs) has been performed in the kitchen. Additionally, example methods, apparatus, systems, and articles of manufacture disclosed herein can be configured to use audio sensors to monitor the kitchen environment and individually detect the performance of all or some of the tasks based on audio captured by the audio sensors. Example methods, apparatus, systems, and articles of manufacture disclosed herein, can additionally use location or direction information derived from the captured audio to determine a kitchen location from which the audio originated. The kitchen location is then used to identify an object (e.g., the refrigerator, the whisk, the cabinet) residing at the kitchen location. Further confirmation that the detected task was performed in the kitchen is obtained when the object residing at the kitchen location is also identified as an object used to perform a detected task in a database. The individual detected tasks (e.g., opening the cabinet, opening the refrigerator, cracking the eggs, etc.) that have been confirmed are also evaluated against a set of activity-related tasks (e.g., tasks 1-11, identified above) known to be performed in connection with the activity of making scrambled eggs. When a sufficient number of the individual detected tasks are included in the set of activity-related tasks, the activity of making scrambled eggs is detected in the kitchen.

Example methods, apparatus, systems, and articles of manufacture disclosed herein, can be used to perform activity monitoring in any desired environment of interest where the activities being monitored generate sound when performed. Further, example methods, apparatus, systems, and articles of manufacture perform activity monitoring in a manner that is less invasive of the privacy of an environment being monitored, less costly, more accurate, and more reliable than existing activity monitoring systems.

FIG. 1 is a block diagram of an example implementation of an example activity monitoring system 100 having environmental sensors 102, an example training manager 105, an example training database 115, and an example activity monitoring manager 110. The activity monitoring system 100 is disposed in an environment of interest 125 (also referred to as a "field of interest"). In some examples, the activity monitoring system 100 can operate in at least two different modes, namely, a training mode and a monitoring mode. In some examples, when operating in the training mode, the training manager 105 is active and the activity monitoring manager 110 is inactive and when operating in the monitoring mode the activity monitoring manager 110 is active and the training manager 105 is inactive.

In order to train the system 100, a set of tasks are performed in the environment of interest 125 with the example training manager 105 active. As each task is performed, the training manager 105 collects ambient audio in the environment (also referred to as "training audio"). The training manager 105 analyzes the training audio to develop a set of training data and extracts/generates audio signatures unique characteristics. The signatures are stored in the training database 115 with information identifying a corresponding task that caused the training audio to be generated.

When operating in the monitoring mode, the example activity monitoring manager 110 receives audio (also referred to as "monitored audio") captured by the example audio sensors 102 in the environment of interest 125. The activity monitoring manager 110 analyzes the monitored audio to produce monitored data and extracts/generates audio signatures based on the monitored data (monitoring signatures). The activity monitoring manager 110 also compares the unique characteristics to training information stored in the training database 115. When a match is detected, a task corresponding to the matching set of unique characteristics (stored in the training database) is identified as a "potential cause" of the monitored audio.

In some examples, the environmental sensors 102 can include audio sensors (e.g., microphones), video sensors (e.g., still image and/or video cameras), motion sensors, object-installed sensors, location sensors, etc. In some such examples, sensed information collected when operating in the training mode and/or the monitoring mode can include any of audio information, video information, motion information, location information, etc. Additionally, unique characteristics (e.g., signatures) can be extracted from all or some of the sensed information for storage in the training database 115 and/or use in detecting tasks/activities.

Tasks detected by the example activity monitoring manager 110 are compared to sets of activity-related tasks. When a threshold number of the detected tasks are included in a set of activity-related tasks, an activity corresponding to the set of activity-related tasks is identified as having been performed/detected in the environment of interest 125.

Figure 2:
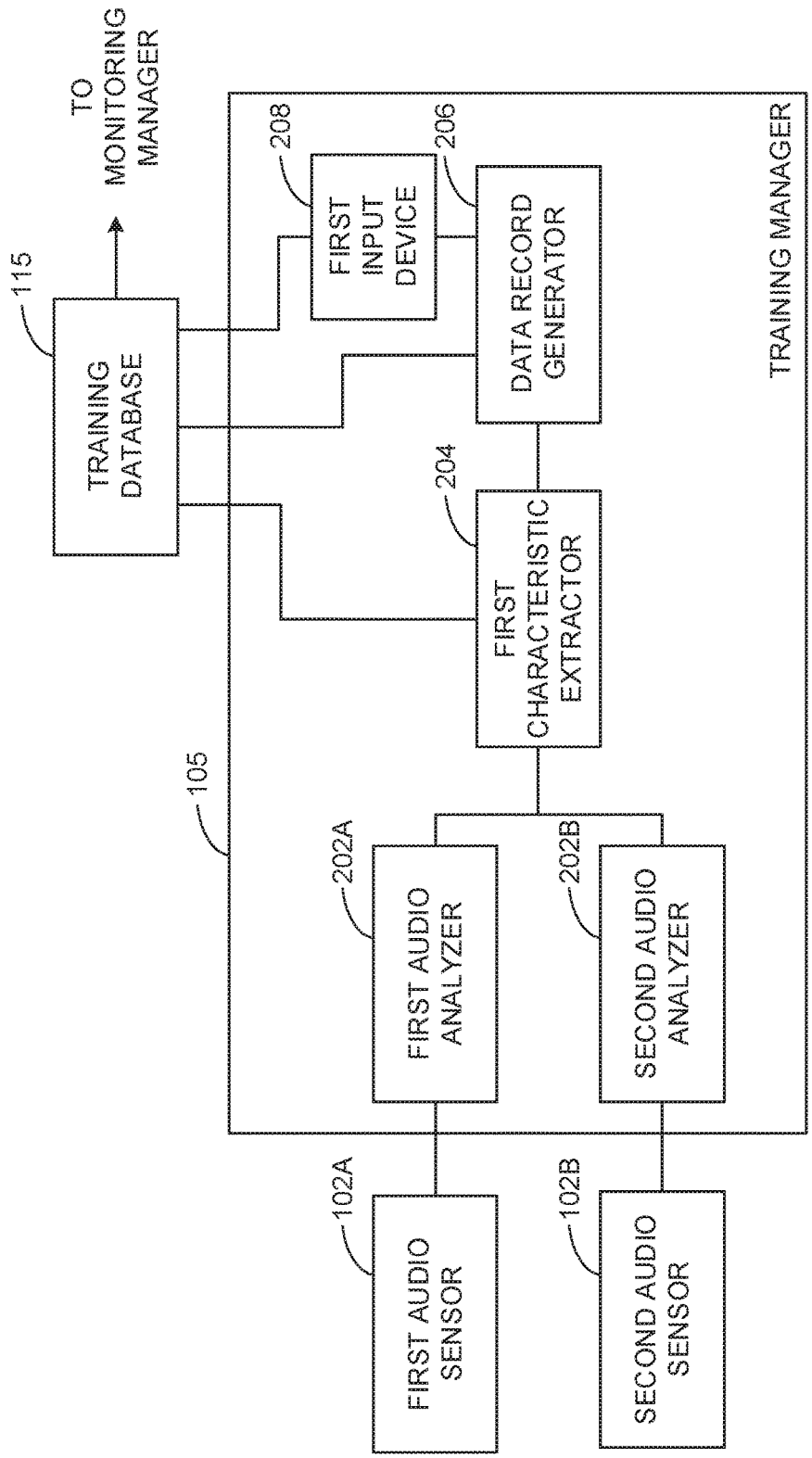
FIG. 2 is a block diagram of an example implementation of the example training manager of FIG. 1.

FIG. 2 is a block diagram of an example implementation of the example training manager 105 of FIG. 1. As described above, the training manager 105 operates when the activity monitoring system 100 is in the training mode. In some examples, the training manager 105 includes an example first audio analyzer 202A, an example second audio analyzer 202B, an example first characteristic extractor 204, an example data record generator 206, and an example input device 208. In some examples, the first audio analyzer 202A receives training audio captured at a first of the environmental sensors 102A and the second audio analyzer 202B receives training audio captured at a second of the environmental sensors 102B. In some such examples, the first of the environmental sensors is a first audio sensor 102A and the second environmental sensor is a second audio sensor 102B. The first audio analyzer 202A and the second audio analyzer 202B analyze the training audio captured at the first and second audio sensors 102A, 102B, respectively. In some examples, the first audio analyzer 202A and the second audio analyzer 202B perform a variety of operations on the training audio. The operations can include noise reduction, signal boosting, transformation of the training audio from a time domain to a frequency domain, extraction of signal strengths, extraction of phase values, etc. In some examples, the analysis of the training audio results in a set of training data which can include the raw training audio, the training audio in a revised format, and/or information extracted from the training audio (e.g., phase frequency bin values, signal strength values, signal to noise ratio values, angle of arrival information, etc.). The first and second audio analyzers 202A, 202B supply the training data to the first characteristic extractor 204.

In some examples, the example first characteristic extractor 204 performs a variety of operations on the training data. The operations result in the generation of a set of unique characteristics corresponding to the training data. In some such examples, the operations performed by the first characteristic extractor 204 include audio signature generation, using one or more angles of arrival to determine a precise location from which the training audio originated (also referred to as "origination location"), etc. Thus, the unique characteristics can include audio signatures, angles of arrival, spectral features (MFCC, mel-filterbanks, spectral density, etc.) temporal features (signal energy, maximum and minimum amplitudes and energy, zero crossing rate, etc.), etc.

The example first characteristic extractor 204 supplies the unique characteristics to the example data record generator 206. In some examples, the first characteristic extractor 204 also supplies the unique characteristics to the example training database 115. The data record generator 206 uses the unique characteristics as well as supplemental information supplied via the example input device 208 to create data records to be stored in the training database 115. In some examples, the supplemental information supplied via the input device 208 can include task identifying information. The task identifying information can include a task identifier code (also referred to as a "task ID code") that identifies a task performed when the corresponding training audio was being collected. In some examples, the information supplied via the input device 208 additionally includes object information identifying an object (or objects) typically used to perform the corresponding task. In some such examples, the objects can be identified by unique names (also referred to as "object names"). The information supplied via the input device 208 can also include location information identifying the location of the one or more of the objects. Thus, in some examples, data records generated by the data record generator 206 include unique characteristics of training audio data collected during the performance of a task, the name of the corresponding task, names of objects used to perform the corresponding task, the locations of such objects, etc.

At least some of the information entered into the training database 115 via the input device 208 (which can include a keyboard, a microphone, a display, a coupling to an external data storage, etc.) can be manually entered and/or automatically entered (e.g., by a machine without human assistance). In some examples, the information is entered in real time when the activity is performed or after the fact by inspecting the audio/visual data. In some examples, to populate the training database 115 with a robust training dataset, a variety of tasks are performed in the environment of interest 125, corresponding training audio caused by such tasks is collected at the first and second audio sensors 102A, 102B, the collected training audio is analyzed and characterized, and resulting signatures, as well as corresponding input data, are organized into one more data records, and stored in the training database 115.

Figure 3:
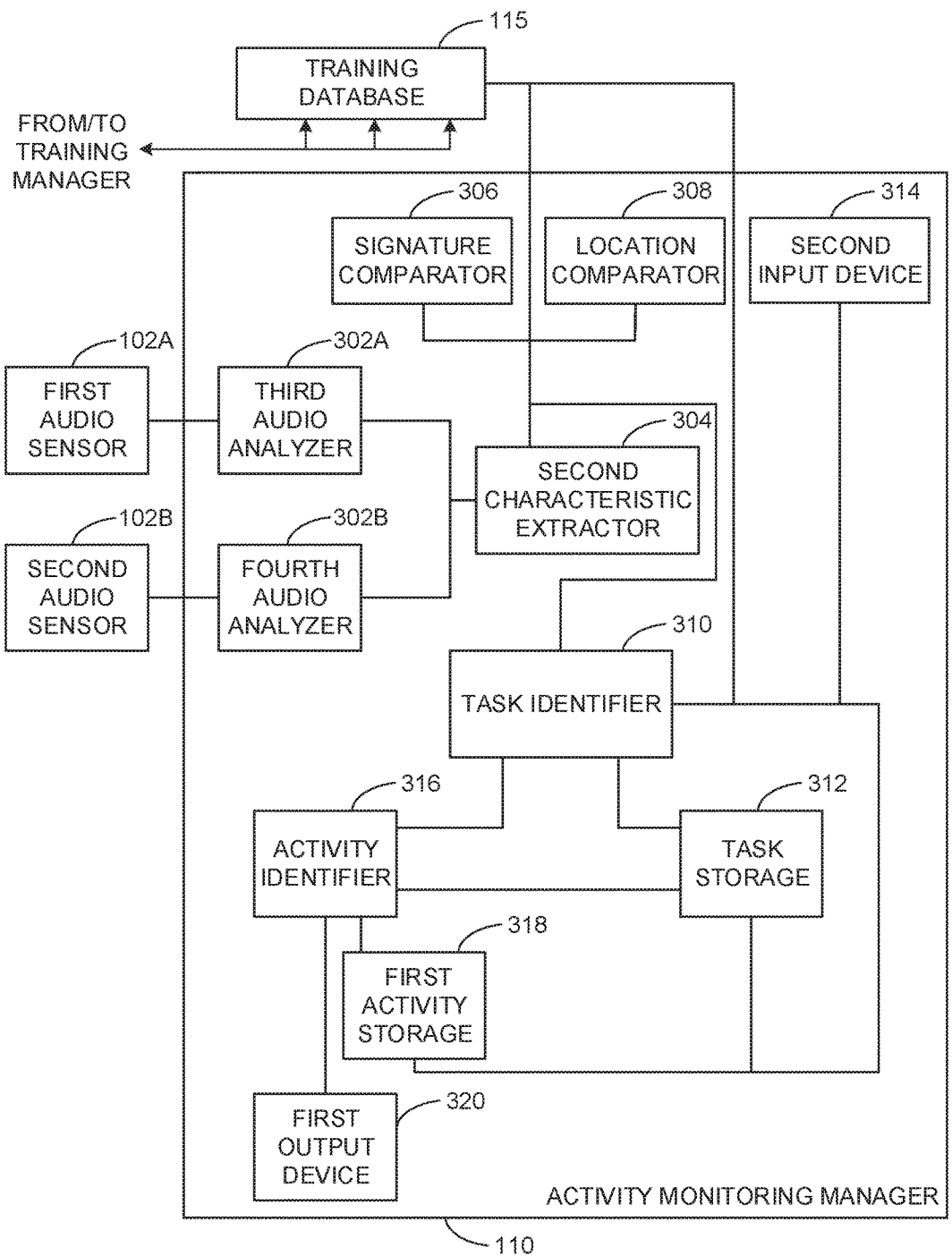
FIG. 3 is a block diagram of a first example implementation of the example activity monitoring manager of FIG. 1.

FIG. 3 is a block diagram of an example implementation of the example activity monitoring manager 110 of FIG. 1. In some examples, the activity monitoring manager 110 includes an example third audio analyzer 302A, an example fourth audio analyzer 302B, an example second characteristic extractor 304, an example signature comparator 306, an example location comparator 308, an example task identifier 310, an example task storage/task database 312, an example second input device 314, an example activity identifier 316, an example first activity storage 318, and an example output device 320. As described above, the activity monitoring manager 110 is operational when the activity monitoring system 100 is operating in the monitoring mode. The monitoring mode is used to identify tasks being performed in the environment of interest 125. In some examples, the third audio analyzer 302A receives monitored audio captured at the first audio sensor 102A and the fourth audio analyzer receives monitored audio captured at the second audio sensor 102B. The third and fourth audio analyzers 302A, 302B perform a variety of operations on the monitored audio captured at the first audio sensor 102A and the second audio sensor 102B, respectively. In some examples, the operations performed by the first and second audio analyzers 302A, 302B can include extracting angles of arrival, determining audio signal strength values, reducing noise in the monitored audio, transforming the monitored audio from a time domain to a frequency domain, determining phase values, etc. In some examples, the information resulting from the operations performed by the first and second audio analyzers 302A, 302B (referred to as monitored audio data) can include the monitored audio in a time domain format and in a frequency domain format, signal strength values, angles of arrival, location information, phase values, the raw monitored audio, etc.

The monitored audio data is supplied by the example third and fourth audio analyzers 302A, 302B to the example second characteristic extractor 304. The second characteristic extractor 304 extracts/generates a set of characteristics from the monitored audio data. The extracted characteristics can include audio signatures, origination location information derived from the angles of arrival, etc. In some examples, the extracted information is unique to the corresponding monitored audio. The second characteristic extractor 304 may additionally perform any other operations designed to extract unique characteristics (e.g., one or more signatures) from the monitored audio data or from the raw monitored audio.

The example second characteristic extractor 304 supplies one or more elements of the extracted information/characteristics to one or more comparators (e.g., the example signature comparator 306, the example location comparator 308, etc.). In some such examples, the second characteristic extractor 304 supplies the monitored signatures to the signature comparator 306 and supplies the origination location information to the location comparator 308.

The signature comparator 306 compares the monitored signatures to the training signatures stored in one or more data records of the training database 115. When a data record having a matching training signature is detected, the example signature comparator 306 retrieves corresponding task information from the data record (also referred to as the "matching data record") having the matching training signature. The signature comparator 306 supplies the corresponding task information, which can include a task ID code, to the example task identifier 310. The task identifier 310 responds to the supplied information by identifying the task as a "potential cause" of the corresponding monitored audio.

The example location comparator 308 compares the origination location information supplied by the second characteristic extractor 304 to one or more training origination locations contained in data records of the training database 115. In some examples, the comparison performed by the location comparator 308 yields a data record that identifies an object positioned at an origination location identified in the origination location information supplied by the second characteristic extractor 304. (The location comparator 308 is also referred to herein as the object identifier in that the comparison performed by the location comparator 308 results in the identification of an object (e.g., yields an object name corresponding to the origination location).) In some such examples, the location comparator 308 retrieves, from the training database 115, an object name corresponding to the object positioned at the location. The location comparator supplies the object name to the example task identifier 310.

The example task identifier 310 compares the object name to a list of task-related objects that can be used to perform the task identified as the "potential cause" of the monitored audio. In some examples, the list of task-related objects is stored in the example training database 115. In some examples, the list of task-related objects is stored in the example task storage 312 (also referred to as a task database 312). In some examples, the list of task-related objects, a corresponding task, and corresponding locations of the task-related objects are stored in the task storage 312. When the object name is included in the list of task-related objects, the task identifier 310 determines that the task is the "determined cause" of the monitored audio. Thus, the task identifier 310 changes the status of the task from the "potential cause" of the monitored audio to a "determined cause" of the monitored audio. In some examples, the location extracted by the second characteristic extractor 304 is associated with multiple objects in the training database 115. This may occur when, for example, the multiple objects are sufficiently close to prevent the identification of a single one of the objects. In such instances, the task identifier 310 may compare the multiple objects identified by the location comparator 308 to the list of task-related objects and, if at least one of the multiple objects is included in the list of task-related objects, the task identified as the "potential cause" is instead identified as the "determined cause" of the monitored audio.

In some examples, lists of task-related objects are input, via the second input device 314, to the example task storage 310. In some such examples, each list of task-related objects is stored with information identifying at least one corresponding task. The lists of task-related objects can be determined by personnel having knowledge of the tasks. In some examples, the objects identified in the lists of task-related objects can be stored with information specifying whether the object is always, or only sometimes, associated with the corresponding task. The task identifier 310 can use any combination of the information stored in the task storage/task database 312, and the training database 115, and information supplied by the example signature and location comparators 306, 308 to identify a task as being a "potential cause" or a "determined cause" of corresponding monitored audio.

In some examples, the example task identifier 310 supplies the task identified as the "determined cause" of the monitored audio to the example activity identifier 316. The activity identifier 316 adds the task identified as the "determined cause" of the monitored audio to a list of ongoing tasks detected by the activity monitoring manager 110. In some examples, the list of ongoing tasks detected by the activity monitoring manager 110 is stored in the task storage 312. In some examples, the list of ongoing tasks includes all tasks performed/detected within a threshold amount of time. In some examples, when a threshold amount of time passes after a task was added to a list of currently ongoing tasks, the list of currently ongoing tasks is considered to be complete and is thereafter assessed by the activity identifier 110 to identify a corresponding activity. In some such examples, the passage of time without the detection of additional tasks is assumed to correspond to the completion of the corresponding activity. In some examples, the activity identifier 316 compares the list of on-going tasks to the lists of activity-related tasks each time a task is supplied by the task identifier 310 to the activity identifier 316 or when some, but not other, tasks are supplied by the task identifier 310 to the activity identifier 316, or when a desired number of tasks have been supplied by the task identifier 310, etc.

The example activity identifier 316 compares the list of ongoing tasks to activity data records stored in the example first activity storage 318 (also referred to as a activity database 318). In some examples, the activity data records each include an activity and a corresponding list of tasks that are (or may be) performed when the activity is conducted (also referred to as a "list of activity-related tasks." In some such examples, when the activity identifier 316 determines that a threshold number of the tasks included in the list of on-going tasks are included in the list of activity-related tasks, the activity identifier 316 identifies an activity corresponding to the list of activity-related tasks as a "detected activity." In some examples, the activity identifier 316 uses a probabilistic approach to determine whether the ongoing tasks correlate to a list of activity-related tasks to a degree sufficient to identify the corresponding activity as the "detected activity." In some examples, the activity identifier 316 identifies more than one possible activity as being the determined activity. In some such examples, the activity identifier 316 can prepare a list of all possible activities along with respective probability information. The probability information can represent a likelihood that the corresponding possible activity is actually being performed in the environment of interest.

In some examples, the example activity identifier 316 stores the detected activity on a list of detected activities in the example first activity storage 318. In some examples, the activity identifier 316 supplies the detected activity to the example first output device 320. In some examples, the first output device 320 is implemented using one or more of a network communication device, a display, a speaker, a coupling to an external memory device, etc.

In some examples, lists of activity-related tasks are input, via the second input device 314, to the example first activity storage 318. In some such examples, each list of activity-related tasks is stored with information identifying at least one corresponding activity. The lists of activity-related tasks can be determined by personnel having knowledge of the tasks. In some examples, the tasks identified in the lists of activity-related tasks can be stored with information specifying whether the object is always, or only sometimes, associated with the corresponding activity. The activity identifier 316 can use any combination of the information stored in the first activity storage 318, the training database 115, and the task storage 312 to identify a "detected activity."

Referring still to FIG. 3, in some examples, the example signature comparator 306 is unable to detect a database record having a training signature that matches the monitored signature. Likewise, in some examples, the example location comparator 308 may be unable to identify an object using the origination location information supplied by the second characteristic extractor 304. In some such examples, the signature comparator 306 and/or the location comparator 308 can notify any of the signature comparator 306, location comparator 308, the example task identifier 310, the example second characteristic extractor 304, etc., to disregard the corresponding monitored audio as being damaged, incomplete or in some way unusable. In some examples, the task identifier 310 responds by adding an unidentified task to the list of on-going tasks as a placeholder. The placeholder can be used by the activity identifier 316 when identifying an activity.

In some examples, when either the monitored signature or the origination location information is damaged, incomplete, and/or unusable, the example activity monitoring manager 110 can be configured to use only the undamaged one of the extracted characteristics to identify a task that is the "potential cause" of the monitored audio. In some such examples, the task is supplied by the task identifier 310 to the activity identifier 316 as the "potential cause" of the monitored audio. The activity identifier 316 can use the task identified as the "potential cause" of the monitored activity to determine the detected activity or can disregard the task.

Referring to FIG. 2 and FIG. 3, in some examples, when operating in either (or both) of the training mode and the operating mode, the example first and second characteristic extractors 204, 304 can be configured to use a first angle of arrival corresponding to the training/monitored audio captured at the first audio sensor 102A to determine a first possible location of a source (object) of the training/monitored audio and to use a second angle of arrival corresponding to the training/monitored audio captured at the second audio sensor 202B to determine a second possible location of a source (object) of the training/monitored audio. In some such examples, the first and second characteristic extractors 204, 304 can be configured to apply a triangulation technique to the first possible location and the second possible location to calculate an "origination location" (also referred to as an "object location") of a source/object from which the training/monitored audio originated.

In some examples, the example activity monitoring system 100 includes more than or fewer than two audio sensors. In some such examples, angle of arrival information corresponding to the training audio collected at each of the audio sensors is used to generate training data for storage in the training database 115 in the manner described above with respect to FIG. 2. Likewise, the activity monitoring manager 110 is equipped to apply triangulation techniques to the angle of arrival information supplied by the multiple audio sensors for use in determining an audio origination location.

Figure 4:
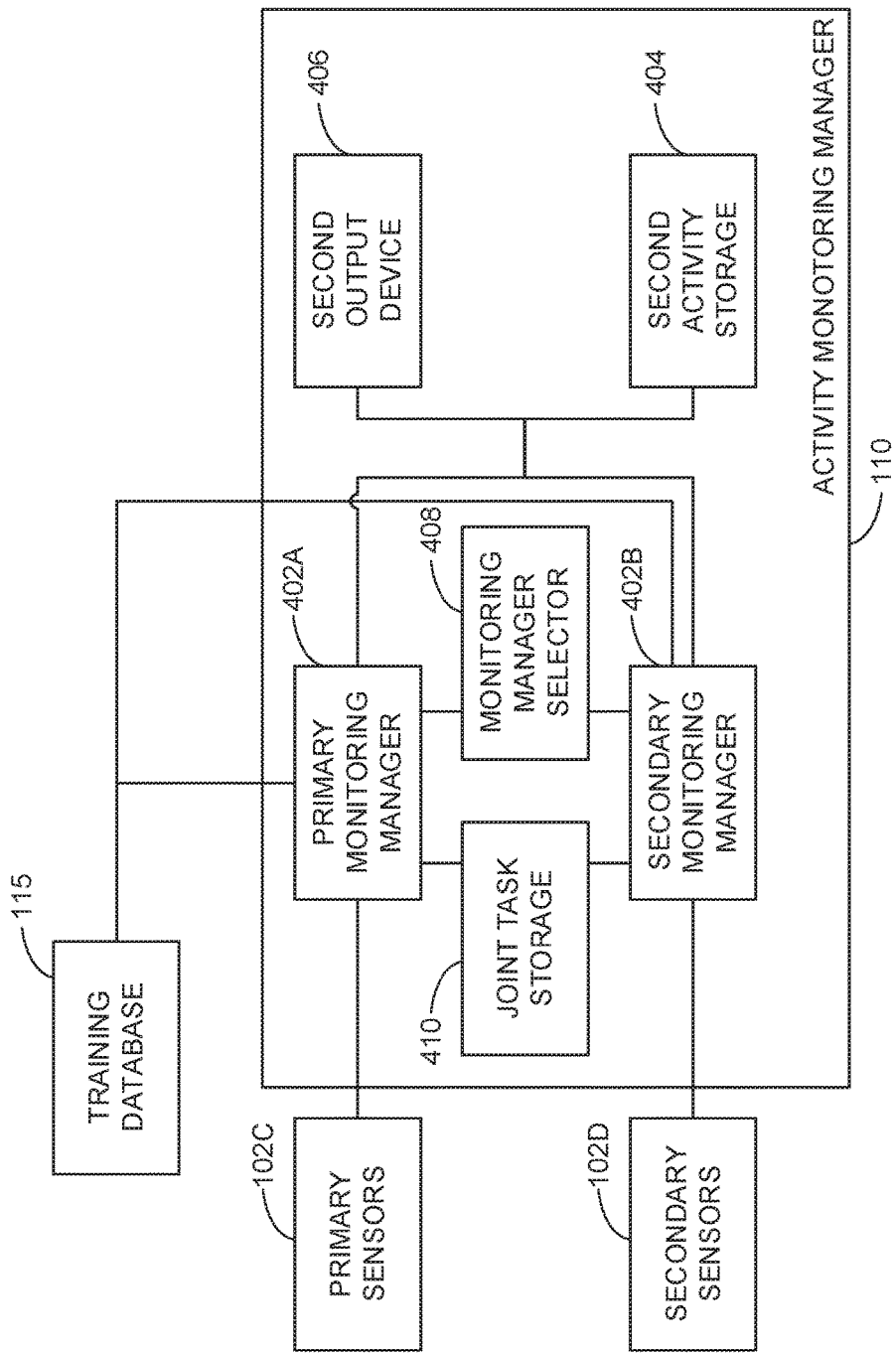
FIG. 4 is a block diagram of a second example implementation of the example activity monitoring manager of FIG. 1.

FIG. 4 is a block diagram of an example second implementation of the example activity monitoring manager 110 of FIG. 1. In the activity monitoring manager 110 of FIG. 4, the example environmental sensors 102 (see FIG. 1) are implemented using a variety of sensor types capable of sensing a variety of environmental information. In some such examples, the environmental sensors 102 can include audio sensors, video sensors, motion sensors, location sensors, etc., to capture training audio, training video, RFID tags, angle of arrival information, etc. In some such examples, the training manager 105 (see FIG. 1 and FIG. 2) of the activity monitoring system 100 can be configured to use the environmental data collected at one or more of the types of environmental sensors to generate the training data stored in the training database 115. Thus, the training data may include video signatures, audio signatures, acceleration data, other movement data, RFID tags, etc. In some such examples, the activity monitoring manager 110 is also configured to use the different types of environmental data supplied by the variety of environmental sensors 102 for use in identifying a task and/or activity being performed in the environment of interest 125.

In some examples, the example activity monitoring system 100 can be configured to treat one or more of the types of environmental sensors 102 as primary data sources (e.g., the primary data sensors 102C) and others of the types of environmental sensors as secondary data sources (the secondary data sensors 102D). In some such examples, the activity monitoring system 100 relies on data provided by the primary data sensors 102C to make a determination as to the identity of a task being performed, unless (or until) there is an indication that the data supplied by the primary data sources is damaged, incomplete, and/or in some way insufficient. When such an indication is received, the activity monitoring system 100 can instead (or additionally) begin relying on data supplied by the secondary data sensors 102D to identify a task being performed in the environment of interest.

In some examples, the activity monitoring manager 110 of FIG. 4 includes an example primary monitoring manager 402A, an example secondary monitoring manager 402B, an example second activity storage 404, an example second output device 406, an example monitoring manager selector 408, and an example join task manager 410. In some examples, the primary monitoring manager 402A and the secondary monitoring manager 402B are each implemented using the example activity monitoring manager 110 of FIG. 3 except that in some such examples, the primary monitoring manager 402A is adapted to analyze and use one or more type(s) of sensor data to identify tasks/activities, and the secondary monitoring manager 402B is adapted to analyze and use one or more type(s) of sensor data different than the type(s) of sensor data used by the primary monitoring manager 204B to identify tasks/activities. When operating in the monitoring mode, the monitoring manager selector 408 selects one of the primary monitoring manager 402A or the secondary monitoring manager 402B to operate using information captured by the primary sensors 102C, and the secondary sensors, respectively, to identify a "determined cause" of a task being performed in the environment of interest 125. The selected one of the primary and secondary monitoring managers 402A, 402B records the task identified as the "determined cause" of captured sensor information in the joint task storage 410. If the selected one of the primary and secondary monitoring managers 402A, 402B is unable to identify a task as a determined cause of captured sensor information, the selected one of the primary and secondary monitoring managers 402A, 402B notifies the manager selector 408. In some such examples, any of the components/elements of the selected one of the primary and secondary monitoring managers 402A, 402B can notify the monitoring manager selector 408 that the captured sensor information is damaged, incomplete, or in some way unusable such that a task cannot be identified as the "determined cause" of the captured sensor information. The monitoring manager selector 408 responds by selecting the other one of the primary and secondary monitoring managers 402A, 402B. The other one of the primary and secondary monitoring managers 402A, 402B responds by using the information captured at the corresponding primary or secondary sensors 102C, 102D to attempt to identify a task as the "determined cause" of the corresponding captured sensor information. Provided that the attempt is successful, the task identified as the "determined cause" of the corresponding sensor information is stored in the joint task storage 410. In some examples, the activity monitoring manager 110 continues to operate in the manner described (e.g., activating one of the primary or the secondary monitoring manager 402A, 402B based on which has access to reliable captured sensor information). In some such examples, either of the primary monitoring manager 402A or the secondary monitoring manager can be selected by the monitoring manager to use the list of tasks stored in the joint task storage 410 to identify a "detected activity" in the same manner described above with respect to FIG. 3. The "detected activity" is stored by the primary or secondary monitoring manager 402A, 402B in the second activity storage 404 and supplied to the second output device 406.

In some examples, as described, above, the primary data sensors may capture, for example, video data, while the second data sensors may capture audio data. In some such examples, video data collected when the environment of interest is dark and, thus, may be insufficient to identify a task being performed. When this occurs, the monitoring manager selector 408 causes the secondary monitoring manager 402B to use audio data collected at the secondary data sensors 102D to identify a task as a "determined cause" of the audio data. Likewise, audio data collected when the environment of interest 100 is polluted with high levels of background noise may be insufficient to identify a task being performed. In such cases, the monitoring manager selector 408 causes the primary monitoring manager 402A to use video data collected at the primary data sensors 102C to identify a task as a "determined cause" of the video data.

In some examples, the example monitoring manager selector 408 is configured to re-select the primary monitoring manager 402A each time new data samples are captured at the primary and secondary sensors 102C, 102D. In some examples, the primary data sensors 102C and the secondary data sensors 102D are a same type of data sensor. In some examples, the primary sensors 102C and the secondary sensors 102D are different types of sensors and the data captured at both the primary sensor(s) and the secondary sensor(s) is used to identify a set of tasks and/or an activity being performed in the environment of interest 125. In some such examples, a task/activity identified based on data captured at the primary sensors 102C can be confirmed based on data captured at the secondary sensors 102D (or vice versa), thereby increasing the accuracy of the activity monitoring system 100.

In some examples, the example first, second, third and fourth audio analyzers 202A, 202B, 302A and 302B are implemented as a same audio analyzer. In some examples, the first and second characteristic extractors 204, 304 are implemented as a same characteristic extractor. Likewise, the first and second input devices 208, 314 can be implemented as a same input device, and the first and second output devices 320, 406 can be implemented as a same output device. Additionally, any of the storage devices can be implemented in a same storage device.

While an example manner of implementing the activity monitoring system 100 of FIG. 1 is illustrated in FIGS. 2, 3, and 4, one or more of the elements, processes and/or devices illustrated in FIGS. 2, 3, and 4 may be combined, divided, re-arranged, omitted, eliminated and/or implemented in any other way. Further, the example environmental sensors 102, the example training manager 105, the example activity monitoring manager 110, the example training database 115, the example first audio analyzer 202A, the example second audio analyzer 202B, the example first characteristic extractor 204, the example data record generator 206, the example input device 208, the example third audio analyzer 302A, the example fourth audio analyzer 302B, the example second characteristic extractor 304, the example signature comparator 306, the example location comparator 308, the example task identifier 310, the example task storage 312, the example first input device 314, the example activity identifier 316, the example first activity storage/activity database 318, the example first output device 320, the example primary sensors 102C, the example secondary sensors 102D, the example primary monitoring manager 402A, the example secondary monitoring manager 402B, the example second activity 404, the example second output device 406, the example monitoring manager selector 408, the example joint task storage 410 and/or, more generally, the example activity monitoring system 100 of FIG. 3 may be implemented by hardware, software, firmware and/or any combination of hardware, software and/or firmware. Thus, for example, any of the example environmental sensors 102, the example training manager 105, the example activity monitoring manager 110, the example training database 115, the example first audio analyzer 202A, the example second audio analyzer 202B, the example first characteristic extractor 204, the example data record generator 206, the example input device 208, the example third audio analyzer 302A, the example fourth audio analyzer 302B, the example second characteristic extractor 304, the example signature comparator 306, the example location comparator 308, the example task identifier 310, the example task storage 312, the example first input device 314, the example activity identifier 316, the example first activity storage/activity database 318, the example first output device 320, the example primary sensors 102C, the example secondary sensors 102D, the example primary monitoring manager 402A, the example secondary monitoring manager 402B, the example second activity 404, the example second output device 406, the example monitoring manager selector 408, the example joint task storage 410 and/or, more generally, the example activity monitoring system 100 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example environmental sensors 102, the example training manager 105, the example activity monitoring manager 110, the example training database 115, the example first audio analyzer 202A, the example second audio analyzer 202B, the example first characteristic extractor 204, the example data record generator 206, the example input device 208, the example third audio analyzer 302A, the example fourth audio analyzer 302B, the example second characteristic extractor 304, the example signature comparator 306, the example location comparator 308, the example task identifier 310, the example task storage 312, the example first input device 314, the example activity identifier 316, the example first activity storage/activity database 318, the example first output device 320, the example primary sensors 102C, the example secondary sensors 102D, the example primary monitoring manager 402A, the example secondary monitoring manager 402B, the example second activity 404, the example second output device 406, the example monitoring manager selector 408, the example joint task storage 410, and/or the example activity monitoring system 100 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example activity monitoring system of 100 FIG. 1 may include one or more elements, processes and/or devices in addition to, or instead of, those illustrated in FIGS. 2, 3, and 4, and/or may include more than one of any or all of the illustrated elements, processes and devices.

Flowcharts representative of example machine readable instructions for implementing the activity monitoring system 100 of FIG. 1, FIG. 2, FIG. 3, and FIG. 4 are shown in FIGS. 5, 6A, 6B, 6C, and 7. In these examples, the machine readable instructions of the flowcharts of FIGS. 5, 6A, 6B, and 6C comprise a program for execution by a processor such as the processor 812 shown in the example processor platform 800 discussed below in connection with FIG. 8. The machine readable instructions of the flowchart of FIG. 7 comprise a program for execution by a processor such as the processor 912 shown in the example processor platform 900 discussed below in connection with FIG. 9. The programs may be embodied in software stored on a non-transitory computer readable storage medium such as a CD-ROM, a floppy disk, a hard drive, a digital versatile disk (DVD), a Blu-ray disk, or a memory associated with the processor 812 or the processor 912, but the entire program and/or parts thereof could alternatively be executed by a device other than the processor 812 (or the processor 912) and/or embodied in firmware or dedicated hardware. Further, although the example programs are described with reference to the flowcharts illustrated in FIGS. 5, 6A, 6B, 6C and 7, many other methods of implementing the example activity monitoring system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 5, 6A, 6B, 6C, and 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Figure 5:
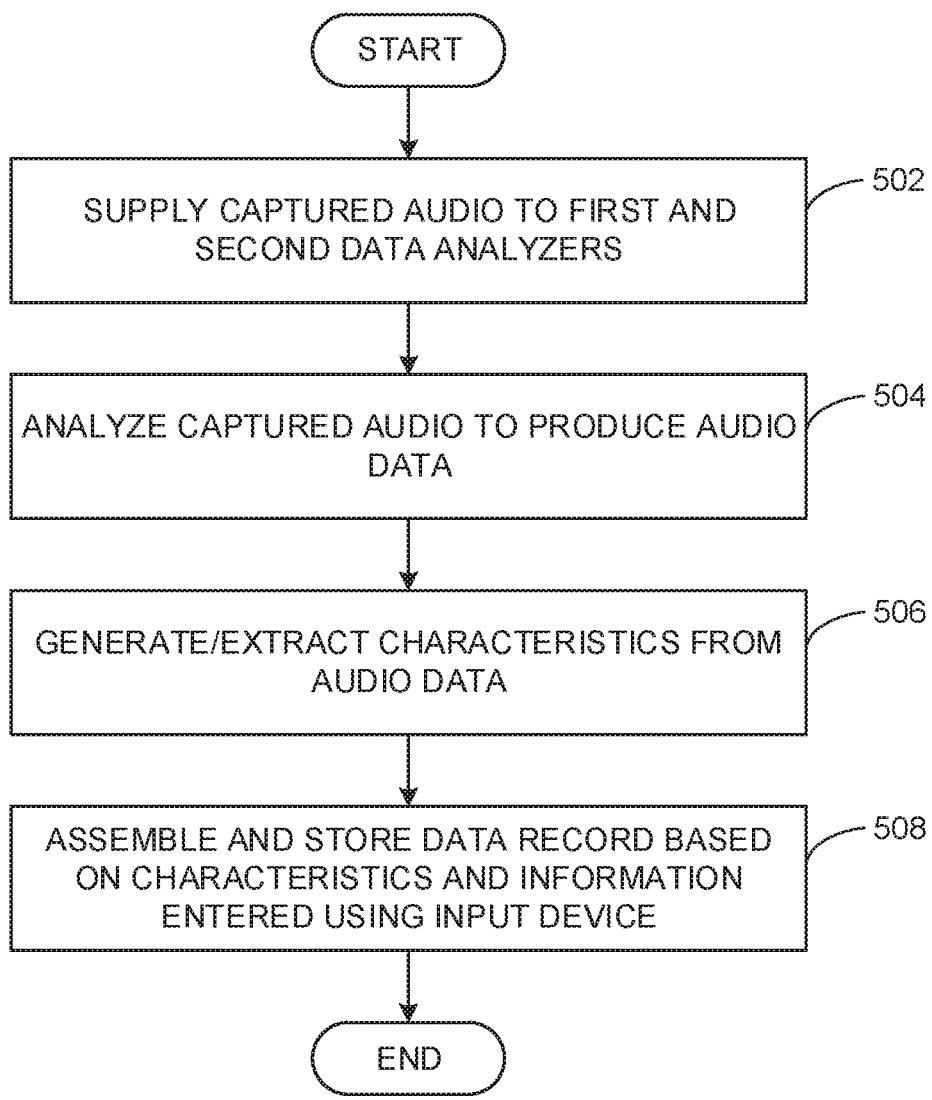
FIG. 5 is a flow chart representative of example machine readable instructions which may be executed to implement the example training manager of FIG. 1, and FIG. 2.

The program 500 of FIG. 5 is executed when the activity monitoring system 100 is in a training mode and begins when first training audio captured at the example first audio sensor 102A (see FIG. 1 and FIG. 2) and second training audio captured at the example second audio sensor 102B (see FIG. 1 and FIG. 2) is supplied to the example first audio analyzer 202A (see FIG. 2) and the example second audio analyzer 202B (see FIG. 2), respectively (block 502). The first training audio and the second training audio captured at the first audio sensor 102A and the second audio sensor 102B is collected contemporaneously with the performance of a task within the environment of interest 125 such that the performance of the task is the cause of the training audio. The first audio analyzer 202A analyzes the first training audio by performing any of a variety of operations on the first training audio and the second audio analyzer 202B analyzes the second training audio by performing any of a variety of operations on the second training audio (block 504). The operations performed by the first and second audio analyzers 202A and 202B can include any of the operations described above with reference to FIG. 2.

The example first and second audio analyzers 202A, 202B supply a resulting first set of training data and a resulting second set of training data, respectively, to the example characteristic extractor 204. The characteristic extractor 204 extracts/determines/generates a set of characteristics from the first and second sets of training data (block 506). As described with reference to FIG. 2 above, the characteristics extracted from the first set of training data and the second set of training data can be any characteristic (or characteristics) that can be used to represent the first and second sets of training data. Examples of the types of characteristics are further described above with reference to FIG. 2.

The characteristics are supplied to the example data record generator 206 which assembles the characteristics (as well as information supplied via the example data input device 208) into a data record (block 508). The data record is subsequently stored in the example training database 115 for later used in identifying a task being performed in the environment of interest 125 (also block 508). In some examples, the information supplied via the data input device 208 is entered at the data input device 208 using manually (e.g., typed at a keyboard of the data input device 208) or automatically (e.g., via a network connection of the data input device 208 or via the loading of information stored on a storage medium of the data input device 208). The information supplied via the data input device 208 can include a task identification code ("task ID code") that identifies the task, a list of objects that are (or may be) used to perform the task, a location of each of the objects that are (or may be) used to perform the task, an expected amount of time elapsing between initiation of the task and completion of the task, etc. In some examples the information supplied via the data input device 208 also includes additional task ID codes corresponding to related tasks. The related tasks can be any tasks that are in some way related to the task corresponding to the first and second training audio. For example, the related tasks can include any tasks that are often performed within a threshold amount of time from a time at which the training task is performed. After the data record is stored the program ends. In some examples, the program 500 is repeated until a complete set of training data has been stored in the training database 115.

Figure 6A:
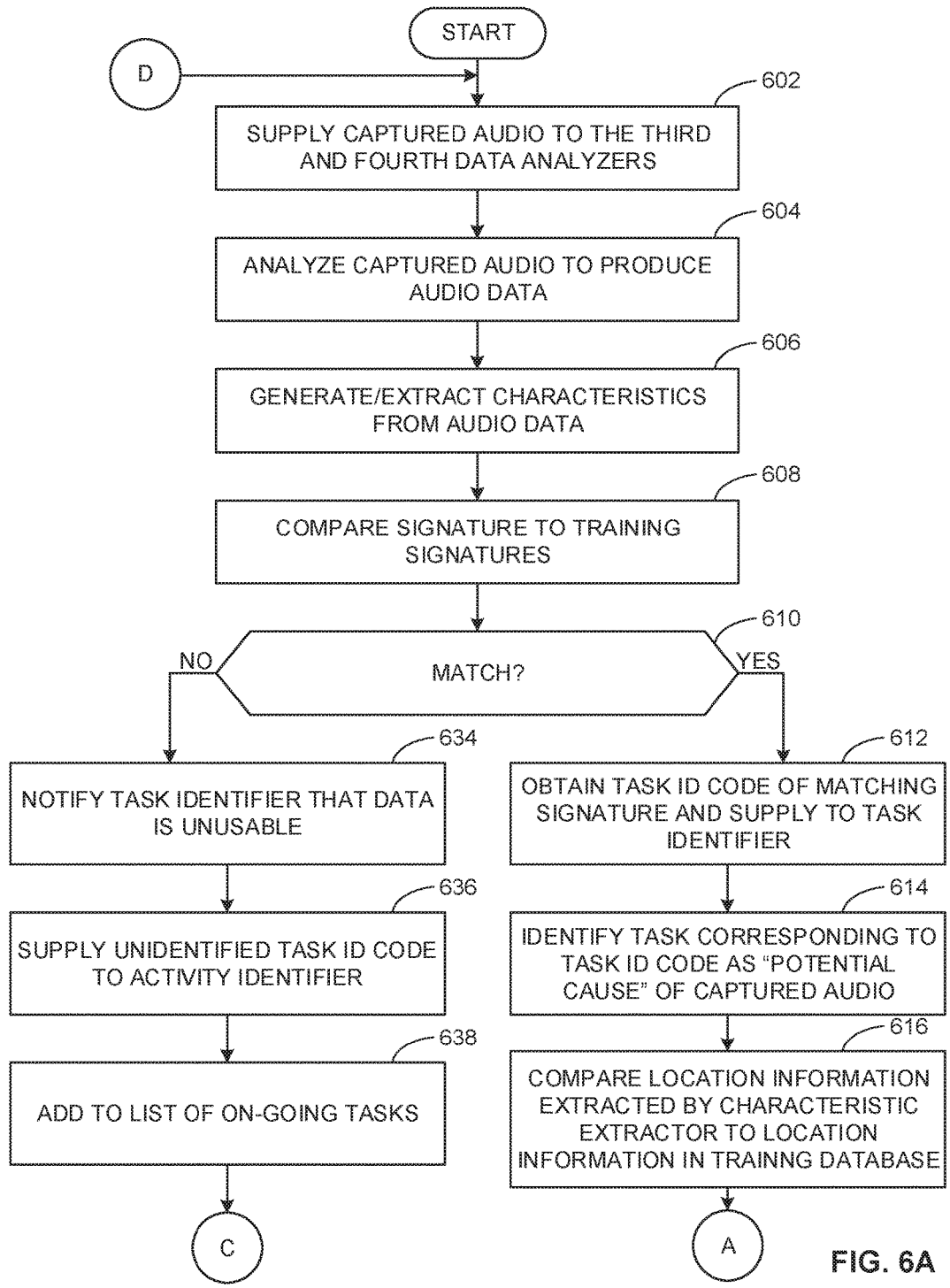
FIGS. 6A, 6B, and 6C illustrate a flow chart representative of example machine readable instructions which may be executed to implement the example activity monitoring manager of FIG. 1, and FIG. 3.
Figure 6B:
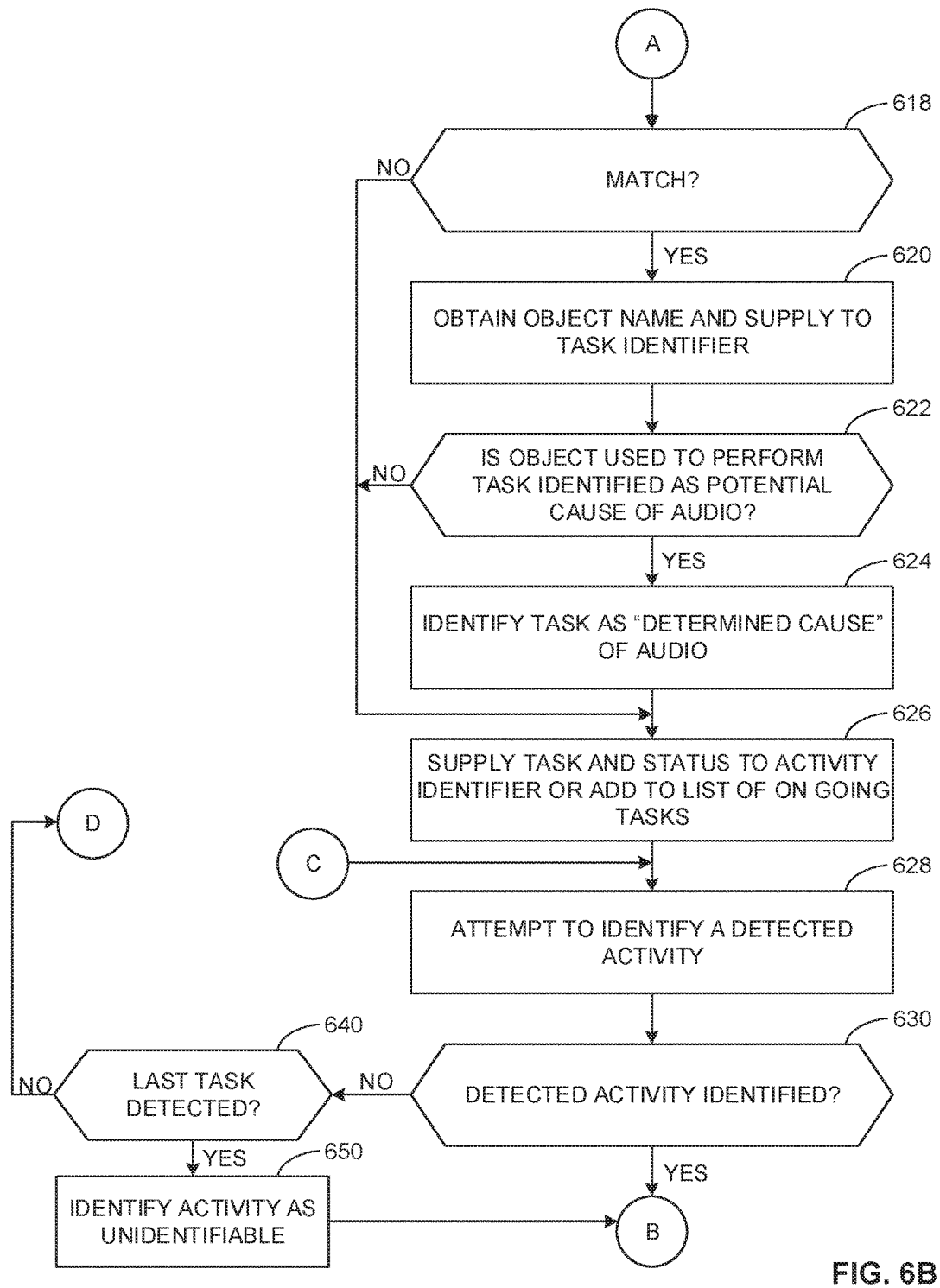
Figure 6C:
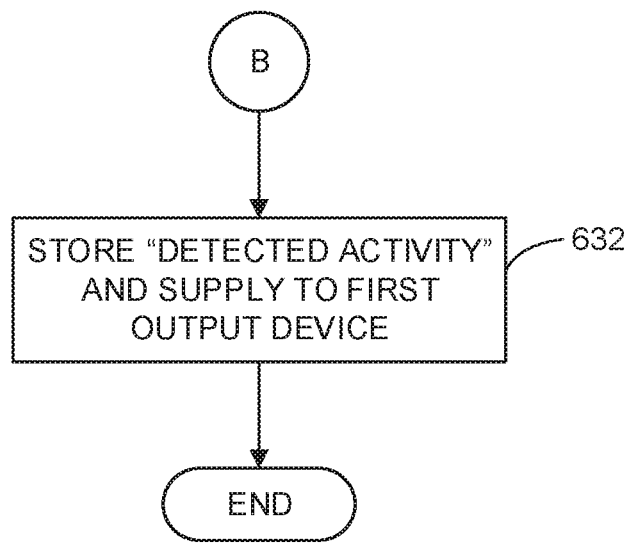

The program 600 of FIGS. 6A, 6B and 6C is executed when the activity monitoring system 100 is in a monitoring mode and begins at block 602 at which first monitoring audio captured at the first audio sensor 102A and second monitoring audio captured at the second audio sensor 102B is supplied to the third audio analyzer 302A and the fourth audio analyzer 302B, respectively. The first monitoring audio and the second monitoring audio captured at the first audio sensor 102A and the second audio sensor 102B is collected in the environment of interest 125, presumably when an (as yet) unidentified task is being performed. Thus, the performance of the unidentified task is the cause of the monitoring audio. The third audio analyzer 302A analyzes the first monitoring audio by performing any of a variety of operations on the first monitoring audio and the fourth audio analyzer 302B analyzes the second monitoring audio by performing any of a variety of operations on the second monitoring audio (block 604). The operations performed by the third and fourth audio analyzers 302A and 302B can include any of the operations described above with reference to FIG. 3.

The example first and second audio analyzers 302A, 302B supply a resulting first set of monitoring data and a resulting second set of monitoring data, respectively, to the example characteristic extractor 204. The characteristic extractor 204 extracts/determines/generates a set of characteristics from the first and second sets of monitoring data (block 606). As described above with reference to FIG. 3, the characteristics extracted from the first set of monitoring data and the second set of monitoring data can be any characteristic (or characteristics) that can be used to represent the first and second sets of training data. Examples of the types of characteristics are further described above with reference to FIG. 3.

The characteristics are supplied to the example signature comparator 306 which compares the characteristics to training signatures contained in training data records stored in the example training database 115 (block 608). When a data record containing a matching training characteristic is found (block 610), a task ID code of the data record is supplied to the example task identifier 310 (block 612). The task identifier 310 causes the task corresponding to the task ID code to be identified as the "potential cause" of the first and second monitoring audio (block 614).

In some examples, the example location comparator 308 compares location information extracted by the example characteristic extractor 304 to location information contained in the training data records of the example training database 115 (block 616). When a data record contains location information that matches the location information supplied by the characteristic extractor 304 (block 618), an object ID code of the data record is supplied to the example task identifier 310 (block 620). The task identifier 310 accesses the task storage 312 to determine whether the identified object is an object that is (or may be) used to perform the task identified as the "potential cause" of the first and second monitoring audio (block 622).

When the example task identifier 310 determines that the identified object is (or may be) used to perform the task identified as the "potential cause" of the first and second monitoring data, the task identifier 310 changes the status of the task from a "potential cause" to a "determined cause" of the first and second monitoring audio (block 624). When the task identifier 310 determines that the identified object is not used to perform the task identified as the "potential cause" of the first and second monitoring data, the task identifier 310 does not change the status of the task (e.g., the task continues to be identified as a "potential cause" of the first and second monitoring audio.

The example task identifier 310 supplies the task and the corresponding status (e.g., potential cause or determined cause) to the example activity identifier 316 for addition to a list of ongoing tasks (block 626). In some examples, the list of ongoing tasks includes tasks that have been detected within a recent time frame and, therefore, are likely to form part of a same activity.

In addition, the example activity identifier 316 attempts to identity an activity corresponding to the list of on-going tasks (block 628). In some examples, the activity identifier 315 attempts to identify a corresponding activity by comparing the tasks included on the list of ongoing tasks to data stored in the example first activity storage/activity database 318. In some examples, the data stored in the first activity storage 318 includes a set of activities. Further, each activity is associated, in the first activity storage 318, with a corresponding set of activity-related tasks that are (or may be) performed during execution of the corresponding activity. In some examples, the data also includes, for each activity-related task, information identifying whether the activity-related task is more likely or less likely to be performed during the activity. The activity identifier 316 searches the data to determine whether a threshold number of the ongoing activity tasks are included in a same set of activity tasks. When the activity identifier 316 determines that a threshold number of the ongoing activity tasks are included in a same set of activity-related tasks (block 630), the activity corresponding to the set of activity-related tasks is identified as a "detected activity" and an activity ID code representing the "detected activity" is stored in the first activity storage 318

(block 632). Additionally, the activity ID code is supplied to the example first output device 320 (also block 632). In some examples, the activity identifier 316 also indicates at time at which the activity was initiated and ended, a date on which the activity was detected, and, if known, a person determined to have performed the activity. The activity identifier 316 can additionally indicate the tasks detected during the activity and/or tasks that (although associated with the activity in the first activity storage 318) were not detected during the activity. After storage and output of the activity ID code corresponding to the detected activity, the program ends. In some examples, the program returns to block 602 to begin monitoring the environment of interest 125 for additional tasks/activities.

In some examples, when, at block 610, a training signature that matching the monitored signature cannot be located in the training database, the example signature comparator 608 notifies the example task identifier 310 that the captured data is unusable (block 634). The task identifier supplies an "unidentified task ID code" to the activity identifier 316 (block 636). The "unidentified task ID code" is used as a placeholder to indicate that a task may have been performed but is not identifiable. The activity identifier 316 adds the "unidentified task ID code" to the list of ongoing tasks (block 638). The program then continues at block 628 and blocks subsequent thereto, as described above.

In some examples, at block 628, the activity identifier 316 attempts to identify a "detected activity" each time a task is added to the list of on-going tasks. In some examples, the activity identifier 316 waits until a threshold number of tasks are included in the list of on-going tasks before attempting to identify a "detected activity."

In some examples, at block 618, a data record having an origination location that matches the location information supplied by the first character extractor 304 is unable to be found. In some such examples, the program continues at block 626 and blocks subsequent thereto, as described above.

In some examples, at block 630, the example activity identifier 316 is unable to identify a "detected activity" based on the list of on-going tasks. When this occurs, the program continues at block 640 at which the activity identifier 316 determines whether the last task added to the list of on-going tasks is a final task of the activity (block 640). In some examples, the activity identifier 316 makes the determination by waiting a threshold amount of time for an additional task to be supplied by the task identifier 310 for addition to the list of ongoing tasks. When no additional tasks are supplied by the task identifier 310 within a threshold amount of time, the activity identifier 316 indicates that the "detected activity" is an unidentifiable activity (block 642) and the program continues at the block 632.

Figure 7:
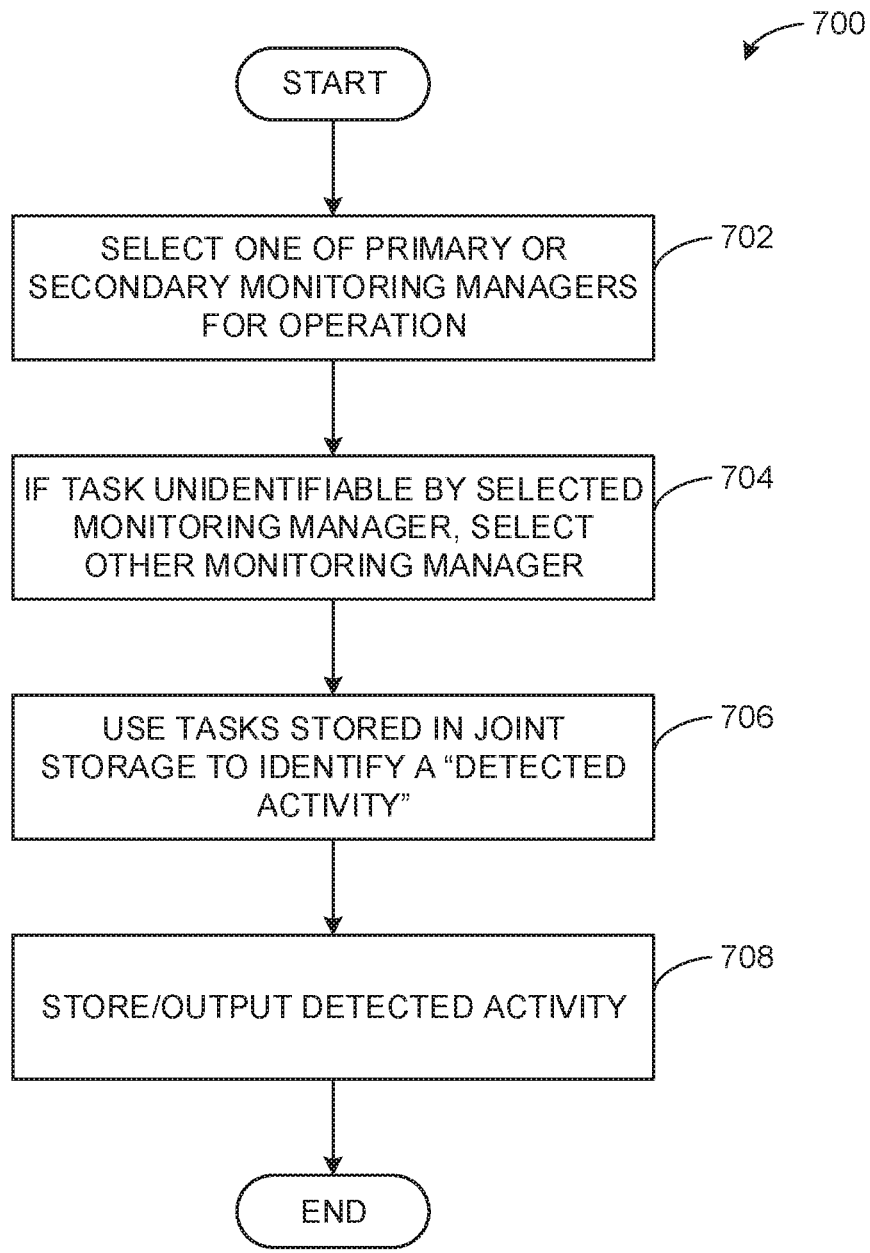
FIG. 7 is a flow chart representative of example machine readable instructions which may be executed to implement the example activity monitoring manager of FIG. 1, and FIG. 4.

The program 700 of FIG. 7 is executed when the activity monitoring system 100 is using multiple types of data to identify an activity performed in the environment of interest 125 (see FIG. 1). The program 700 begins at block 702 at which the monitoring manager selector 408 (see FIG. 4) selects one of the primary monitoring manager 402A (see FIG. 4) or the secondary monitoring manager 402B (see FIG. 4) to operate using information captured by the example primary sensors 102C (see FIG. 4), and the example secondary sensors 102D, respectively, to identify a task as a "determined cause" of the captured sensor information and store the identified task in the joint task storage 410. When the monitoring manager selector 408 is unable to identify a task as a "determined cause" of captured sensor information, the monitoring manager selector 408 selects the other of the primary and second monitoring managers 402A, 402B (block 704) to identify a task as a "determined cause" of the captured sensor information and store the identified task in the joint task storage 410. A selected one of the primary or second monitoring managers 402A, 402B uses information stored in the joint task storage 410 to identify a "detected activity" (block 706). The selected one of the primary or second monitoring managers 402A, 402B causes the "detected activity" to be stored in the second activity storage 404 and to be output by the example second output device 406 (block 708). Thereafter the program ends. In some examples, the program repeatedly executes to identify additional tasks/activities performed in the environment of interest 125.

Figure 8:
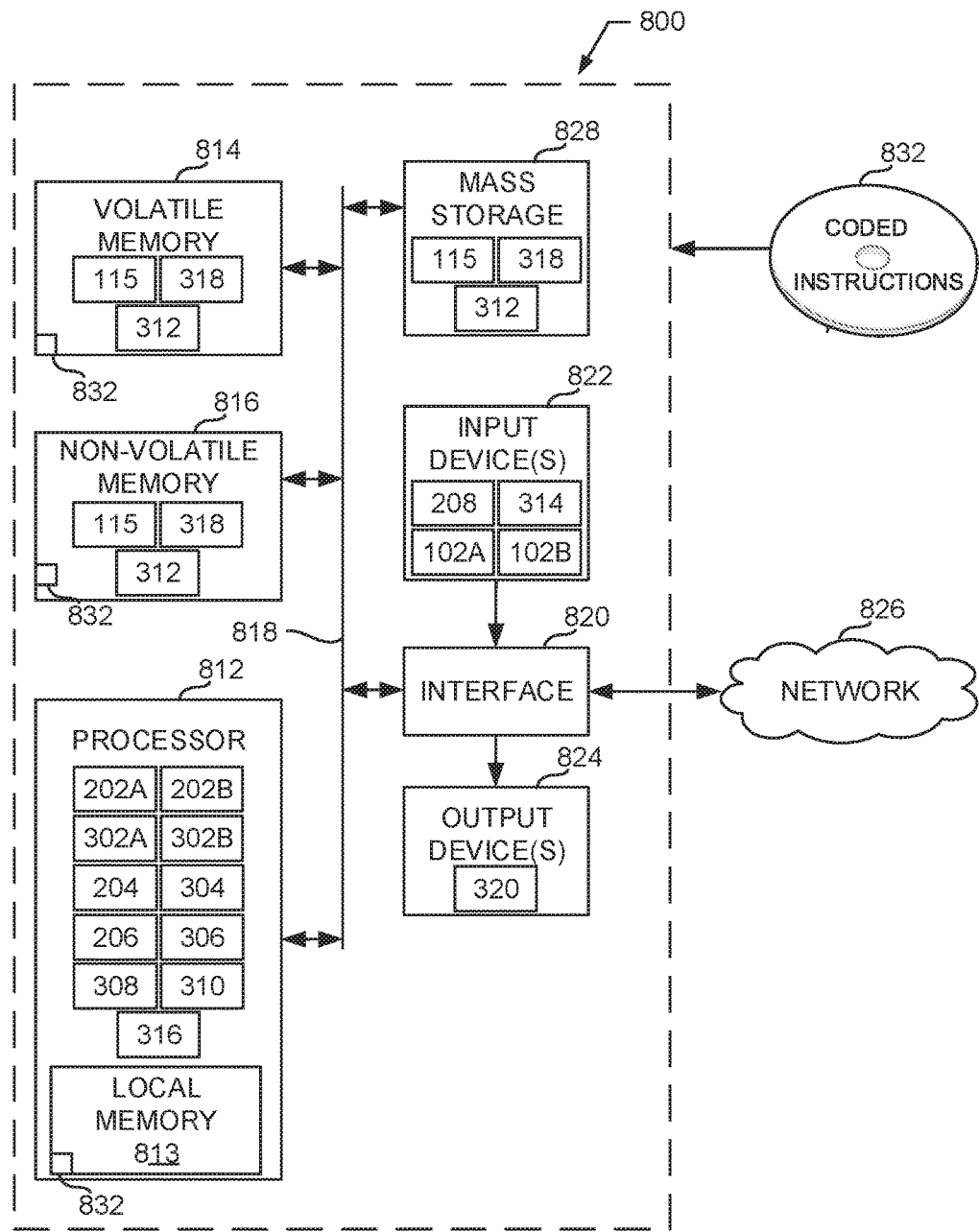
FIG. 8 is a block diagram of an example processor platform capable of executing the instructions of FIGS. 5, 6A, 6B, and/or 6C. to implement the example activity monitoring system of FIGS. 1, 2, and 3.

FIG. 8 is a block diagram of an example processor platform 800 capable of executing the instructions of FIGS. 5, 6A, 6B, and/or 6C to implement the activity monitoring system 100 of FIGS. 1, 2, and 3. The processor platform 800 can be, for example, a server, a personal computer, a mobile device (e.g., a cell phone, a smart phone, a tablet such as an iPad™), a personal digital assistant (PDA), an Internet appliance, a gaming console, a personal video recorder, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. The hardware processor may be a semiconductor based (e.g., silicon based) device. In this example, the processor implements the example training manager 105, the example activity monitoring manager 110, the example first audio analyzer 202A, the example second audio analyzer 202B, the example first characteristic extractor 204, the example data record generator 206, the example third audio analyzer 302A, the example fourth audio analyzer 302B, the example second characteristic extractor 304, the example signature comparator 306, the example location comparator 308, the example task identifier 310, and the example activity identifier 316.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller. In some examples, the main memory is used to implement the example training database 115, the example task storage 312, and/or the example first activity storage 318.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system. The input device 822 can be used to implement the example first and second input devices 208, 314. The input device 822 can also be used to implement the first and second audio sensors 102A, 102B.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip and/or a graphics driver processor. The output device 820 can be used to implement the example first output device 320.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives. The mass storage devices 828 can be used to implement the example training database 115, the example task storage 312 and/or the example first activity storage 318.

The coded instructions 832 of FIGS. 5, 6A, 6B, and 6C may be stored in the mass storage device 828, in the volatile memory 814, in the non-volatile memory 816, and/or on a removable tangible computer readable storage medium such as a CD or DVD.

Figure 9:
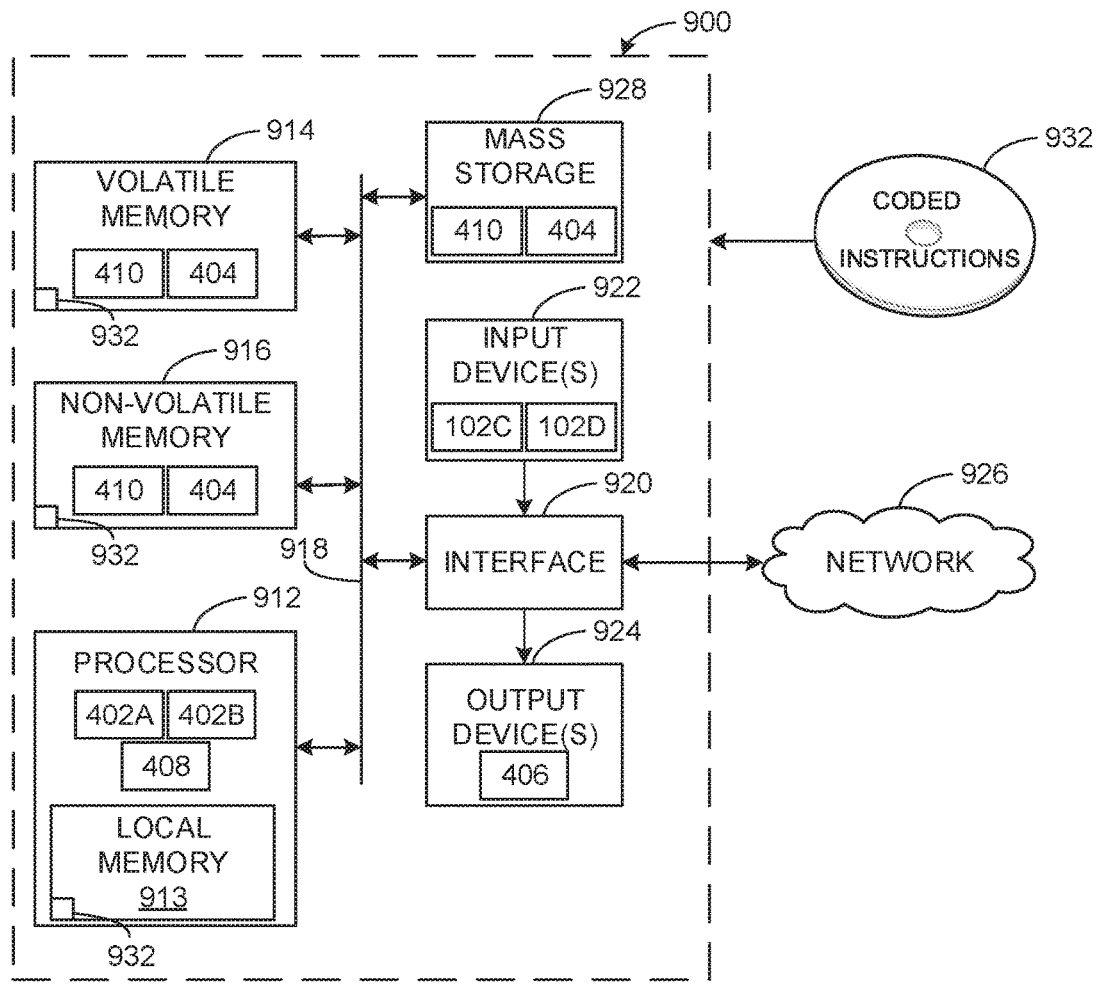
FIG. 9 is a block diagram of an example processor platform capable of executing the instructions of FIG. 7 to implement the example activity monitoring system of FIG. 1, and FIG. 4.

FIG. 9 is a block diagram of an example processor platform 900 capable of executing the instructions of FIG. 7 to implement the activity monitoring manager 110 of FIG. 4. The processor platform 900 can be, for example, a server, a personal computer, a mobile device (e.g., a cell phone, a smart phone, a tablet such as an iPad™), a personal digital assistant (PDA), an Internet appliance, a gaming console, a personal video recorder, or any other type of computing device. The processor platform 900 may be used to implement all or some of the same devices as the processor platform 800, and, as such the devices are not repeated here.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware processor may be a semiconductor based (e.g., silicon based) device. In this example, the processor implements the example primary monitoring manager 402A, the example secondary monitoring manager 402B, and the example monitoring manager selector 408.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller. The main memory may be used to implement the example joint task storage 410 and the example second activity storage 404.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system. The input device 922 can be used to implement the example primary and secondary sensors 102C, 102D.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip and/or a graphics driver processor. The output device 920 can be used to implement the example second output device 406.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives. The mass storage devices 928 can be used to implement the example joint task storage 410 and the example second activity storage 404.

The coded instructions 932 of FIG. 7 may be stored in the mass storage device 928, in the volatile memory 914, in the non-volatile memory 916, and/or on a removable tangible computer readable storage medium such as a CD or DVD.

From the foregoing, it will be appreciated that example methods, apparatus and articles of manufacture have been disclosed that perform activity monitoring in a manner that is less invasive of the privacy of an environment being monitored, less costly, more accurate, and more reliable than existing activity monitoring systems.

Example No. 1 is a task monitor that includes a signature comparator to compare a first signature to a second signature. The first signature is generated based on first audio collected in an environment of interest, the second signature is generated based on second audio collected during performance of a task in the environment of interest. The task monitor further includes an object identifier to identify an object corresponding to a location. The location is determined based on an angle of arrival of the first audio at a sensor. The task monitor further includes a task identifier to identify the task as a cause of the first audio when the signature comparator determines the first signature matches the second signature and the object identifier identifies the object as a same object used to perform the task.

Example No. 2 includes the task monitor of Example No. 1 wherein the task identified as the cause of the first audio is one of a set of ongoing tasks. The task monitor of Example No. 2 also includes an activity monitor to compare the set of ongoing tasks to a set of activity-related tasks corresponding to an activity, and, when a threshold number of the ongoing tasks are included in the set of activity-related tasks, determine that the activity has been detected.

Example No. 3 includes the task monitor of Example No. 2, wherein the activity monitor is further to determine that the activity has been detected based on whether the threshold number of ongoing tasks included in the set of activity-related tasks were detected in a first order. The first order corresponds to a second order in which the training activity-related tasks were performed.

Example No. 4 includes the task monitor of any of Example Nos. 1-3, wherein the angle of arrival is a first angle of arrival, the location is an object location, the sensor is a first sensor, and the first angle of arrival is determined based on the capture of the first audio at the first sensor. The task monitor of Example No. 4 further includes a second sensor at which a second angle of arrival is determined based on the capture of the first audio at the second sensor. In Example No. 4, the object location is further determined based on the second angle of arrival.

Example No. 5 is the task monitor of Example No. 4, wherein the object location is further determined by applying triangulation to a first location determined using the first angle of arrival and a second location determined using the second angle of arrival.

Example No. 6 is the task monitor of any of Example Nos. 1-3, wherein the object is a first object and the task monitor further includes a database. The database includes object names and object locations. The object names correspond to a plurality of objects, including the first object and the object locations correspond to respective positions in the environment of interest at which respective ones of the plurality of objects are located. The object identifier uses the database to identify the first object.

Example No. 7 is the task monitor of any of Example Nos. 1-3, wherein the task is one of a plurality of tasks and the task monitor further includes a signature database containing a plurality of signatures, including the second signature. The signatures in the signature database are associated with the tasks, and the signature comparator accesses the signature database when comparing the first signature to the second signature. The task monitor of Example No. 7 also includes a task database including the plurality of tasks, sets of task-related objects used to perform the tasks, and locations at which the task-related objects are positioned. The object identifier accesses the task database to identify the object corresponding to the location.

Example No. 8 is a non-transitory machine readable storage medium including that, when executed, cause a machine to at least compare a first signature to a second signature. The first signature is generated based on first audio collected in an environment of interest and the second signature is generated based on second audio collected in the environment of interest. The second audio is caused by the performance of a known task in the environment of interest. The instructions further cause the machine to identify a location in the environment of interest from which the first audio originated and an object positioned at the location. The object is identified based on the location. The instructions further cause the machine to, when the first audio signature matches the second audio signature and the object is a same object used to perform the task, identify the known task as a cause of the first audio.

Example No. 9 is the non-transitory machine-readable medium of Example No. 8, wherein the task identified as the cause of the first audio is a first ongoing task of a plurality of ongoing tasks and the instructions further to cause the machine to compare the plurality of ongoing tasks, including the first ongoing task, to a set of activity-related tasks associated with an activity. The instructions also cause the machine to, when a threshold number of the plurality of ongoing tasks are included in the set of activity-related tasks, determine that the activity has been detected in the environment of interest.

Example No. 10 is the non-transitory machine-readable medium of Example No. 9, wherein the determining that the activity has been detected in the environment of interest is further based on whether the plurality of ongoing tasks are detected in a first order corresponding to a second order of the plurality of activity-related tasks.

Example No. 11 is the non-transitory machine readable medium of any of Example Nos. 8-10 wherein the instructions further to cause the machine to determine a first angle of arrival of the first audio at a first sensor, determine a second angle of arrival of the first audio at a second sensor. In Example No. 11, the identifying of the location from which the first audio originated includes using the first and second angles of arrival.

Example No. 12 is the non-transitory machine-readable medium of Example No. 11, wherein the location is a first location and the identifying of the first location includes using a triangulation technique, a second location derived from the first angle of arrival, and a third location derived from the second angle of arrival.

Example No. 13 is the non-transitory machine readable medium of any of Example Nos. 8-10, wherein the object is a first object of a plurality of objects, and the identifying of the first object includes accessing a database. The database includes names of the plurality of objects and object locations at which the plurality of objects are positioned in the environment of interest.

Example No. 14 is the non-transitory machine-readable medium of any of Example Nos. 8-10, wherein the first audio is collected in a monitoring mode and the second audio is collecting a training mode. Further, the first signature is a monitoring signature and the second signature is a training signature and the identifying of the task as the potential cause of the first audio includes accessing a signature database in which the training signature is associated with the task. In Example No. 14, the identifying of the task as the cause of the first audio includes accessing a task database in which the object is associated with the task.

Example No. 15 is the non-transitory machine-readable medium of any of Example Nos. 8-10, wherein the instructions further cause the machine to generate the second audio signature based on the second audio, and generate a data record for storage in a signature database. The data record associates the second audio signature with information identifying the task, and comparing the first audio signature to the second audio signature includes accessing the signature database.

Example No. 16 is a method to detect the performance of a task. The method includes comparing, by executing an instruction with at least one processor, a first unique audio characteristic extracted from first audio to a second unique audio characteristic extracted from second audio, the second audio is collected during execution of a task. The method also includes identifying, by executing an instruction with the at least one processor, an object based on a location from which the first audio originated and, when the second audio characteristic matches the first audio characteristic, identifying, by executing an instruction with the at least one processor, the task as a potential cause of the first audio. The method of Example No. 16 additionally includes, when the object corresponds to a same object used to perform the task, identifying, by executing an instruction with the at least one processor, the task as the determined cause of the first audio.

Example No. 17 is the method of claim 16, wherein the task is a first ongoing task of a plurality of ongoing tasks. The method further includes comparing the plurality of ongoing tasks to a plurality of activity-related tasks associated with an activity, and, when a threshold number of the plurality of ongoing tasks are included in the plurality of activity-related tasks, determining that the activity has been detected.

Example No. 18 is the method of claim 17, wherein the determining that the activity has been detected is further based on whether the plurality of on-going tasks are detected in a first order corresponding to a second order in which the plurality of activity-related tasks are performed.

Example No. 19 is the method of any of Example Nos. 16-18 and further includes determining an angle of arrival of the first audio at a sensor, and determining the location from which the first audio originated based on the angle of arrival.

Example No. 20 is the method of Example No. 19, wherein the angle of arrival is a first angle of arrival and the sensor is a first sensor and the method further includes determining a second angle of arrival of the first audio at a second sensor. In the method of Example No. 19, the determining of the location is further based on a combination of the first and second angles of arrival.

Example No. 21 is the method of any of Example Nos. 16-18, wherein the object is a first object of a plurality of objects, the location is a first location of a plurality of locations and the task is a first task of a plurality of tasks. The method of Example No. 21 further includes populating an audio characteristic database with a plurality of unique audio characteristics including the second unique audio characteristic. In Example No. 21, the unique audio characteristics are associated with tasks in the audio characteristic database. The method also includes populating a task database with the plurality of tasks, the plurality of objects, and the plurality of locations. The objects are associated with locations and with tasks in the task database. The method also includes populating an activity database with sets of the tasks, and associating the sets of the tasks with respective activities in the activity database.

Example No. 22 is the method of Example No. 21, wherein any of the audio characteristic database, the task database, and the activity database are included in a same database.

Example No. 23 is a task monitor that includes a comparator to make a comparison between a first unique audio characteristic and a second unique audio characteristic. The first unique audio characteristic is generated based on first audio collected in an environment of interest during performance of a monitored task and the second unique audio characteristic is based on second audio collected during performance of a training task in the environment of interest. The task monitor further includes an object identifier to identify an object based on a location from which the first audio originated and a task identifier to identify the monitored task and the training task as corresponding to a same task based on the comparison. The task identifier is further to identify the monitored task and the training task as corresponding to the same based on whether the object identified by the object identifier is associated with the training task.

Example No. 24 is the task monitor of Example No. 23, wherein the object identifier is to identify the object by comparing the location to a plurality of object locations in a database. When the location matches an object location in the database, the object identifier is further to identify the object corresponding to the object location in the database.

Example No. 25 is the task monitor of any of Example Nos. 23 and 24, wherein the identified task is one of a set of ongoing tasks and the task monitor also includes an activity monitor to compare the set of ongoing tasks to a set of activity-related tasks corresponding to an activity, and, when a threshold number of the ongoing tasks are included in the set of activity-related tasks, determine that the activity has been detected.

Example No. 26 is the task monitor of Example No. 25, wherein the activity monitor is further to determine that the activity has been detected based on an order in which the ongoing tasks were detected and an order in which the activity-related tasks are arranged in a database.

Example No. 27 is the task monitor of any of Example Nos. 23 and 24, further including a data extractor to extract location data from the first audio. The location data is to be used to determine the location.

Example No. 28 is the task monitor of Example No. 27, wherein the location data includes an angle of arrival of the first audio at a first sensor.

Example No. 29 is the task monitor of Example No. 28, wherein the angle of arrival is a first angle of arrival, and the location is determined by applying a triangulation technique to a first location determined using the first angle of arrival and a second location determined using a second angle of arrival of the first audio at a second sensor.

Example No. 30 is a non-transitory machine readable storage medium including instructions which, when executed, cause a machine to at least compare a first signature to a second signature. The first signature is generated based on first audio collected in an environment of interest and the second signature is generated based on second audio collected during performance of a task in the environment of interest. The instructions further cause the machine to identify an object based on a location from which the first audio originated and identify the task as a cause of the first audio based on the comparison of the first signature to the second signature, and further based on whether the object identified by the object identifier is used to perform the task.

Example No. 31 is the non-transitory machine readable medium of Example 30, wherein the identifying of the object includes comparing the location to a plurality of object locations in a database and, when the location matches an object location in the database, identifying the object corresponding to the object location in the database.

Example No. 32 is the non-transitory machine readable medium of any of Example Nos. 30 and 31, wherein the task identified as the cause of the first audio is one of a set of ongoing tasks and the instructions further to cause the machine to compare the set of ongoing tasks to a set of activity-related tasks corresponding to an activity. The instructions also cause the machine to, when a threshold number of the ongoing tasks are included in the set of activity-related tasks, determine that the activity has been detected.

Example No. 33 is the non-transitory machine readable medium of Example No. 32, wherein the instructions further cause the machine to determine that the activity has been detected based on an order in which the ongoing tasks were detected and an order in which the activity-related tasks are arranged in a database.

Example No. 34 is the non-transitory machine readable medium of any of Example Nos. 30 and 31, wherein the instructions further cause the machine to extract location data from the first audio and the location data is to be used to determine the location.

Example No. 35 is the non-transitory machine readable medium of Example No. 34, wherein the location data includes an angle of arrival of the first audio at a first sensor.

Example No. 36 is a task monitor that includes means to compare a first signature to a second signature. The first signature is generated based on first audio collected in an environment of interest, and the second signature is generated based on second audio collected during performance of a task in the environment of interest. The task monitor also includes means to identify an object corresponding to a location. The location is determined based on an angle of arrival of the first audio at a sensor. The task monitor further includes means to identify the task as a cause of the first audio when the first signature matches the second signature and when the object is identified as a same object used to perform the task.

Example No. 37 is the task monitor of Example No. 36, wherein the task identified as the cause of the first audio is one of a set of ongoing tasks and the task monitor further includes means to compare the set of ongoing tasks to a set of activity-related tasks corresponding to an activity. The task monitor also includes means to determine that the activity has been detected when a threshold number of the ongoing tasks are included in the set of activity-related tasks.

Example No. 38 is the task monitor of Example No. 37, wherein the means to determine that the activity has been detected is further to determine that the activity has been detected based on whether the threshold number of ongoing tasks included in the set of activity-related tasks were detected in a first order. The first order corresponds to a second order in which the training activity-related tasks were performed.

Example No. 39 is the task monitor of any of Example Nos. 36-38, wherein the angle of arrival is a first angle of arrival, the location is an object location, the sensor is a first sensor, and the first angle of arrival is determined based on the capture of the first audio at the first sensor. The task monitor of Example No. 39 also includes a second sensor that determines a second angle of arrival based on the capture of the first audio at the second sensor. The object location is further determined based on the second angle of arrival.

Example No. 40 is the task monitor of Example No. 36, further including means to determine the location based on the first angle of arrival of the first audio at the first sensor and further based on a second angle of arrival of the first audio at a second sensor.

Example No. 41 is the task monitor of Example No. 40, wherein the means to determine the location is further to determine the location by applying a triangulation technique.

Example No. 42 is the task monitor of any of Example Nos. 36-38, wherein the object is a first object, and the task monitor further includes a database. The database includes object names and object locations. The object names correspond to a plurality of objects, including the first object and the object locations correspond to respective positions in the environment of interest at which respective ones of the plurality of objects are located. In Example No. 42, the means to identify the object uses the database to identify the first object.

Example No. 43 is an apparatus that includes means to perform any of the methods included in any of the Examples.

Example No. 44 is machine readable storage including machine readable instructions that, when executed, are to implement any of the methods included in any of the Examples, and/or are to realize any of the apparatus included in any of the Examples.

Example No. 45 is the task monitor of Example No. 1, wherein the angle of arrival is a first angle of arrival, the location is an object location, the sensor is a first sensor, and the first angle of arrival is determined based on the capture of the first audio at the first sensor. The task monitor of Example No. 45 also includes a second sensor. A second angle of arrival is determined based on the capture of the first audio at the second sensor, and the object location is further determined based on the second angle of arrival.

Example No. 46 is the task monitor of Example No. 45, wherein the object location is further determined by applying triangulation to a first location determined using the first angle of arrival and a second location determined using the second angle of arrival.

Example No. 47 is the task monitor of Example No. 1, wherein the object is a first object, and wherein the task monitor also includes a database. The database includes object names and object locations. The object names correspond to a plurality of objects, including the first object, and the object locations correspond to respective positions in the environment of interest at which respective ones of the plurality of objects are located. In Example No. 47, the object identifier uses the database to identify the first object.

Example No. 48 is the task monitor of Example 1, wherein the task is one of a plurality of tasks. The task monitor of Example No. 48 also includes a signature database containing a plurality of signatures, including the second signature. The signatures in the signature database are associated with the tasks, and the signature comparator accesses the signature database when comparing the first signature to the second signature. The task monitor also includes a task database that includes the plurality of tasks, sets of task-related objects used to perform the tasks, and locations at which the task-related objects are positioned. In Example No. 48, the object identifier is to access the task database to identify the object corresponding to the location.

Example No. 49 is the non-transitory machine readable medium of Example No. 8, wherein the instructions further to cause the machine to determine a first angle of arrival of the first audio at a first sensor and determine a second angle of arrival of the first audio at a second sensor. In Example No. 49, the identifying of the location from which the first audio originated includes using the first and second angles of arrival.

Example No. 50 is the non-transitory machine-readable medium of Example No. 49, wherein the location is a first location and the identifying of the first location includes using a triangulation technique. In Example No. 50, a second location is derived from the first angle of arrival, and a third location is derived from the second angle of arrival.

Example No. 51 is the non-transitory machine readable medium of Example No. 8, wherein the object is a first object of a plurality of objects, and the identifying of the first object includes accessing a database. The database includes names of the plurality of objects and object locations at which the plurality of objects are positioned in the environment of interest.

Example No. 52 is the non-transitory machine-readable medium of Example No. 8, wherein the first audio is collected in a monitoring mode and the second audio is collecting a training mode, and the first signature is a monitoring signature and the second signature is a training signature. In Example No. 52, the identifying of the task as the potential cause of the first audio includes accessing a signature database in which the training signature is associated with the task, and the identifying of the task as the cause of the first audio includes accessing a task database in which the object is associated with the task.

Example No. 53 is the non-transitory machine-readable medium of Example No. 8, wherein the instructions further cause the machine to generate the second audio signature based on the second audio, and generate a data record for storage in a signature database. In Example No. 53, the data record associates the second audio signature with information identifying the task, and comparing the first audio signature to the second audio signature includes accessing the signature database.

Example No. 54 is the method of Example No. 16, and further includes determining an angle of arrival of the first audio at a sensor, and determining the location from which the first audio originated based on the angle of arrival.

Example No. 55 is the method of Example No. 54, wherein the angle of arrival is a first angle of arrival and the sensor is a first sensor. The method of Example No. 55 also includes determining a second angle of arrival of the first audio at a second sensor. In Example No. 55, the determining of the location is further based on a combination of the first and second angles of arrival.

Example No. 56 is the method of Example No 16, wherein the object is a first object of a plurality of objects, the location is a first location of a plurality of locations, and the task is a first task of a plurality of tasks. The method of Example No. 56 also includes populating an audio characteristic database with a plurality of unique audio characteristics including the second unique audio characteristic. The unique audio characteristics are associated with tasks in the audio characteristic database. The method further includes populating a task database with the plurality of tasks, the plurality of objects, and the plurality of locations. The objects are associated with locations and with tasks in the task database. The method additionally includes populating an activity database with sets of the tasks, and associating the sets of the tasks with respective activities in the activity database.

Example No. 57 is the method of Example No. 56, wherein any of the audio characteristic database, the task database, and the activity database are included in a same database.

Example No. 58 is the task monitor of Example No. 23, wherein the identified task is one of a set of ongoing tasks. The task monitor of Example No. 58 further includes an activity monitor to compare the set of ongoing tasks to a set of activity-related tasks corresponding to an activity, and, when a threshold number of the ongoing tasks are included in the set of activity-related tasks, determine that the activity has been detected.

Example No. 59 is the task monitor of Example No. 58, wherein the activity monitor is further to determine that the activity has been detected based on an order in which the ongoing tasks were detected and based on an order in which the activity-related tasks are arranged in a database.

Example No. 60 is the task monitor of Example No. 23, further including a data extractor to extract location data from the first audio. The location data is used to determine the location.

Example No. 61 is the task monitor of Example No. 60, wherein the location data includes an angle of arrival of the first audio at a first sensor.

Example No. 62 is the task monitor of Example No. 61, wherein the angle of arrival is a first angle of arrival, and the location is determined by applying a triangulation technique to a first location and a second location. The first location is determined using the first angle of arrival and the second location is determined using a second angle of arrival of the first audio at a second sensor.

Example No. 63 is the non-transitory machine readable medium of Example No. 30, wherein the task identified as the cause of the first audio is one of a set of ongoing tasks and the instructions further to cause the machine to compare the set of ongoing tasks to a set of activity-related tasks corresponding to an activity. The instructions also cause the machine to, when a threshold number of the ongoing tasks are included in the set of activity-related tasks, determine that the activity has been detected.

Example No. 64 is the non-transitory machine readable medium of Example No. 63, wherein the instructions further cause the machine to determine that the activity has been detected based on an order in which the ongoing tasks were detected and an order in which the activity-related tasks are arranged in a database.

Example No. 65 is the non-transitory machine readable medium of Example No. 30, wherein the instructions further cause the machine to extract location data from the first audio and the location data is to be used to determine the location.

Example No. 66 is the non-transitory machine readable medium of Example No. 65, wherein the location data includes an angle of arrival of the first audio at a first sensor.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A task monitor comprising:
   a signature comparator to compare a first signature to a second signature, the first signature generated based on first audio collected in an environment of interest, the second signature generated based on second audio collected during performance of a task in the environment of interest;
   an object identifier to identify an object corresponding to a location, the location determined based on an angle of arrival of the first audio at a sensor;
   a task identifier to identify the task as a cause of the first audio when the signature comparator determines the first signature matches the second signature and the object identifier identifies the object as a same object used to perform the task.

2. The task monitor of claim 1, wherein the task identified as the cause of the first audio is one of a set of ongoing tasks, the task monitor further including an activity monitor to:
  compare the set of ongoing tasks to a set of activity-related tasks corresponding to an activity; and
  when a threshold number of the ongoing tasks are included in the set of activity-related tasks, determine that the activity has been detected.

3. The task monitor of claim 2, wherein the activity monitor is further to:
  determine that the activity has been detected based on whether the threshold number of ongoing tasks included in the set of activity-related tasks were detected in a first order, the first order corresponding to a second order in which the training activity-related tasks were performed.

4. The task monitor of claim 1, wherein the angle of arrival is a first angle of arrival, the location is an object location, the sensor is a first sensor, and the first angle of arrival is determined based on the capture of the first audio at the first sensor, the task monitor further including:
  a second sensor, a second angle of arrival being determined based on the capture of the first audio at the second sensor, and the object location further being determined based on the second angle of arrival.

5. The task monitor of claim 4, wherein the object location is further determined by applying triangulation to a first location determined using the first angle of arrival and a second location determined using the second angle of arrival.

6. The task monitor of claim 1, wherein the object is a first object, the task monitor further including a database, the database including object names and object locations, the object names corresponding to a plurality of objects, including the first object, the object locations corresponding to respective positions in the environment of interest at which respective ones of the plurality of objects are located, and the object identifier uses the database to identify the first object.

7. The task monitor of claim 1, wherein the task is one of a plurality of tasks, the task monitor further including:
  a signature database, the signature database containing a plurality of signatures, including the second signature, the signatures in the signature database being associated with the tasks, and the signature comparator to access the signature database when comparing the first signature to the second signature; and
  a task database, the task database including the plurality of tasks, sets of task-related objects used to perform the tasks, and locations at which the task-related objects are positioned, the object identifier to access the task database to identify the object corresponding to the location.

8. A non-transitory machine readable storage medium comprising instructions which, when executed, cause a machine to at least:
  compare a first signature to a second signature, the first signature generated based on first audio collected in an environment of interest, the second signature generated based on second audio collected in the environment of interest, and the second audio being caused by the performance of a known task in the environment of interest;
  identify a location in the environment of interest from which the first audio originated and an object positioned at the location, the object being identified based on the location;
  when the first audio signature matches the second audio signature and the object is a same object used to perform the task, identify the known task as a cause of the first audio.

9. The non-transitory machine-readable medium of claim 8, wherein the task identified as the cause of the first audio is a first ongoing task of a plurality of ongoing tasks, the instructions further to cause the machine to:
  compare the plurality of ongoing tasks, including the first ongoing task, to a set of activity-related tasks associated with an activity; and
  when a threshold number of the plurality of ongoing tasks are included in the set of activity-related tasks, determine that the activity has been detected in the environment of interest.

10. The non-transitory machine-readable medium of claim 9, wherein the determining that the activity has been detected in the environment of interest is further based on whether the plurality of ongoing tasks are detected in a first order corresponding to a second order of the plurality of activity-related tasks.

11. The non-transitory machine readable medium of claim 8, the instructions further to cause the machine to:
  determine a first angle of arrival of the first audio at a first sensor;
  determine a second angle of arrival of the first audio at a second sensor; wherein the identifying of the location from which the first audio originated includes using the first and second angles of arrival.

12. The non-transitory machine-readable medium of claim 11, wherein the location is a first location and the identifying of the first location includes using a triangulation technique, a second location derived from the first angle of arrival, and a third location derived from the second angle of arrival.

13. The non-transitory machine readable medium of claim 8, wherein the object is a first object of a plurality of objects, and the identifying of the first object includes accessing a database, the database including names of the plurality of objects and object locations at which the plurality of objects are positioned in the environment of interest.

14. The non-transitory machine-readable medium of claim 8, wherein the first audio is collected in a monitoring mode and the second audio is collecting a training mode, the first signature is a monitoring signature and the second signature is a training signature, the identifying of the task as the potential cause of the first audio includes accessing a signature database in which the training signature is associated with the task, and the identifying of the task as the cause of the first audio includes accessing a task database in which the object is associated with the task.

15. The non-transitory machine-readable medium of claim 8, wherein the instructions further cause the machine to:
  generate the second audio signature based on the second audio; and
  generate a data record for storage in a signature database, the data record associating the second audio signature with information identifying the task, wherein comparing the first audio signature to the second audio signature includes accessing the signature database.

16. A method to detect the performance of a task, the method comprising:
  comparing, by executing an instruction with at least one processor, a first unique audio characteristic extracted from first audio to a second unique audio characteristic extracted from second audio, the second audio collected during execution of a task;

identifying, by executing an instruction with the at least one processor, an object based on a location from which the first audio originated;

when the second audio characteristic matches the first audio characteristic, identifying, by executing an instruction with the at least one processor, the task as a potential cause of the first audio; and when the object corresponds to a same object used to perform the task, identifying, by executing an instruction with the at least one processor, the task as the determined cause of the first audio.

17. The method of claim 16, wherein the task is a first ongoing task of a plurality of ongoing tasks, the method further including:

comparing the plurality of ongoing tasks to a plurality of activity-related tasks associated with an activity; and when a threshold number of the plurality of ongoing tasks are included in the plurality of activity-related tasks, determining that the activity has been detected.

18. The method of claim 17, wherein the determining that the activity has been detected is further based on whether the plurality of on-going tasks are detected in a first order corresponding to a second order in which the plurality of activity-related tasks are performed.

19. The method of claim 16, further including:

determining an angle of arrival of the first audio at a sensor; and determining the location from which the first audio originated based on the angle of arrival.

20. A non-transitory machine readable storage medium comprising instructions which, when executed, cause a machine to at least:

compare a first signature to a second signature, the first signature generated based on first audio collected in an environment of interest, the second signature generated based on second audio collected during performance of a task in the environment of interest;

identify an object based on a location from which the first audio originated;

identify the task as a cause of the first audio based on the comparison of the first signature to the second signature, and further based on whether the object identified by the object identifier is used to perform the task.

21. The non-transitory machine readable medium of claim 20, the identifying of the object includes comparing the location to a plurality of object locations in a database and, when the location matches an object location in the database, identifying the object corresponding to the object location in the database.

22. The non-transitory machine readable medium of claim 20, wherein the task identified as the cause of the first audio is one of a set of ongoing tasks, the instructions further to cause the machine to:

compare the set of ongoing tasks to a set of activity-related tasks corresponding to an activity; and when a threshold number of the ongoing tasks are included in the set of activity-related tasks, determine that the activity has been detected.

23. The non-transitory machine readable medium of claim 22, wherein the instructions further cause the machine to:

determine that the activity has been detected based on an order in which the ongoing tasks were detected and an order in which the activity-related tasks are arranged in a database.

24. The non-transitory machine readable medium of claim 20, wherein the instructions further cause the machine to extract location data from the first audio, the location data to be used to determine the location.

25. The non-transitory machine readable medium of claim 24, wherein the location data includes an angle of arrival of the first audio at a first sensor.

* * * * *